(12) United States Patent
Bayley et al.

(10) Patent No.: US 8,857,786 B2
(45) Date of Patent: Oct. 14, 2014

(54) LAVATORY SYSTEM

(75) Inventors: Graeme S. Bayley, Brookfield, WI (US); John Loberger, Germantown, WI (US); Brendan Doorhy, Westmont, IL (US); Joseph Mazza, Elgin, IL (US); Brian Gaza, Naperville, IL (US); Donald O'Brien, Buffalo Grove, IL (US)

(73) Assignee: Bradley Fixtures Corporation, Menomonee Falls, WI (US)

( * ) Notice: Subject to any disclaimer, the term of this patent is extended or adjusted under 35 U.S.C. 154(b) by 242 days.

(21) Appl. No.: 12/626,519

(22) Filed: Nov. 25, 2009

(65) Prior Publication Data
US 2010/0132112 A1    Jun. 3, 2010

Related U.S. Application Data

(63) Continuation of application No. 11/041,882, filed on Jan. 21, 2005, now abandoned.

(60) Provisional application No. 60/538,583, filed on Jan. 23, 2004, provisional application No. 60/602,585, filed on Aug. 18, 2004.

(51) Int. Cl.
E03C 1/33     (2006.01)
E03C 1/05     (2006.01)

(52) U.S. Cl.
CPC ..................... *E03C 1/057* (2013.01)
USPC ............... 251/129.04; 4/623; 4/631

(58) Field of Classification Search
CPC ....................................... E03C 11/057
USPC ............. 4/623, 624, 619, 631, 638–640, 643; 251/129.04, 129.03
See application file for complete search history.

(56) References Cited

U.S. PATENT DOCUMENTS

| 4,239,555 A | 12/1980 | Scharlack et al. |
| 4,256,133 A | 3/1981 | Coward et al. |
| 4,541,563 A | 9/1985 | Uetsuhara |
| 4,644,256 A | 2/1987 | Farias et al. |
| 4,722,372 A | 2/1988 | Hoffman et al. |

(Continued)

FOREIGN PATENT DOCUMENTS

| CA | 2 068 693 | 12/1992 |
| DE | 42 18 658 | 12/1992 |

(Continued)

OTHER PUBLICATIONS

International Search Report and Written Opinion for Application No. PCT/US2005/002194, date of mailing May 12, 2005, 9 pages.

(Continued)

*Primary Examiner* — J. Casimer Jacyna
(74) *Attorney, Agent, or Firm* — Foley & Lardner LLP

(57) ABSTRACT

A lavatory system is provided that includes a first wash station having a first fluid dispensing fixture and a first drain, a second wash station having a second fluid dispensing fixture and a second drain, a support structure extending between the first wash station and the second wash station and at least one array of photovoltaic cells supported at the support structure. The at least one array of photovoltaic cells is configured to provide power for operating both the first fluid dispensing fixture and the second fluid dispensing fixture.

17 Claims, 14 Drawing Sheets

(56) References Cited

U.S. PATENT DOCUMENTS

| | | | |
|---|---|---|---|
| 4,742,583 A | 5/1988 | Yoshida et al. | |
| 4,744,515 A | 5/1988 | Watanabe | |
| 4,761,840 A * | 8/1988 | Harding | 4/664 |
| 4,839,039 A | 6/1989 | Parsons et al. | |
| 4,852,802 A | 8/1989 | Iggulden et al. | |
| 4,916,382 A | 4/1990 | Kent | |
| 4,959,603 A | 9/1990 | Yamamoto et al. | |
| 4,980,574 A | 12/1990 | Cirrito | |
| 5,063,955 A | 11/1991 | Sakakibara | |
| 5,224,685 A | 7/1993 | Chiang et al. | |
| 5,235,232 A | 8/1993 | Conley et al. | |
| 5,251,872 A | 10/1993 | Kodaira | |
| 5,367,442 A | 11/1994 | Frost et al. | |
| 5,398,182 A | 3/1995 | Crosby | |
| 5,418,402 A | 5/1995 | Fujiwara | |
| 5,436,513 A | 7/1995 | Kaye et al. | |
| 5,497,135 A | 3/1996 | Wisskirchen et al. | |
| 5,515,818 A | 5/1996 | Born | |
| 5,565,714 A | 10/1996 | Cunningham | |
| 5,588,636 A | 12/1996 | Eichholz et al. | |
| 5,611,093 A | 3/1997 | Barnum et al. | |
| 5,651,384 A | 7/1997 | Rudrich | |
| 5,960,813 A * | 10/1999 | Sturman et al. | 137/78.3 |
| 6,056,808 A | 5/2000 | Krause | |
| 6,257,264 B1 | 7/2001 | Sturman et al. | |
| 6,286,153 B1 | 9/2001 | Keller | |
| 6,313,609 B1 | 11/2001 | Brink | |
| 6,393,634 B1 | 5/2002 | Kodaira et al. | |
| 6,405,995 B1 * | 6/2002 | Spain | 251/129.11 |
| 6,420,646 B2 * | 7/2002 | Benz et al. | 136/251 |
| 6,523,193 B2 | 2/2003 | Saraya | |
| 6,568,655 B2 | 5/2003 | Paese et al. | |
| 6,964,404 B2 | 11/2005 | Patterson et al. | |
| 7,075,768 B2 | 7/2006 | Kaneko | |
| 2001/0022352 A1 | 9/2001 | Rudrich | |
| 2002/0157176 A1 | 10/2002 | Wawrla et al. | |
| 2002/0171056 A1 | 11/2002 | Paese et al. | |
| 2004/0035976 A1 | 2/2004 | Byrd et al. | |
| 2004/0066271 A1 | 4/2004 | Leck | |
| 2004/0083547 A1 | 5/2004 | Mercier | |
| 2005/0205818 A1 | 9/2005 | Bayley et al. | |

FOREIGN PATENT DOCUMENTS

| | | |
|---|---|---|
| DE | 196 08 157 | 7/1997 |
| DE | 102 10 474 | 9/2002 |
| EP | 1 057 942 | 12/2000 |
| EP | 1170805 A2 | 1/2002 |
| EP | 1 241 301 | 9/2002 |
| FR | 2 802 792 | 6/2001 |
| GB | 2 428 004 | 1/2007 |
| JP | 07-102601 | 4/1995 |
| JP | 9-242155 | 9/1997 |
| JP | 2000-282528 | 10/2000 |
| WO | WO 01/16436 | 3/2001 |
| WO | WO 2005/073476 | 8/2005 |

OTHER PUBLICATIONS

Office Action for U.S. Appl. No. 11/041,882, date mailed Jun. 5, 2006, 6 pages.
Response to Office Action for U.S. Appl. No. 11/041,882, date mailed Jul. 5, 2006, 8 pages.
Office Action for U.S. Appl. No. 11/041,882, date mailed Sep. 21, 2006, 9 pages.
Response to Office Action for U.S. Appl. No. 11/041,882, date mailedDec. 20, 2006, 14 pages.
Office Action for U.S. Appl. No. 11/041,882, date mailed Mar. 16, 2007, 8 pages.
Response to Office Action for U.S. Appl. No. 11/041,882, date mailed Jun. 18, 2007, 17 pages.
Advisory Action for U.S. Appl. No. 11/041,882, date mailed Jun. 26, 2007, 5 pages.
Notice of Appeal From the Examiner to the Board of Patent Appeals and Interferences for U.S. Appl. No. 11/041,882, date mailed Aug. 13, 2007, 2 pages.
Brief on Appeal for U.S. Appl. No. 11/041,882, date mailed Nov. 13, 2007, 49 pages.
Examiner's Answer for U.S. Appl. No. 11/041,882, date mailed Feb. 8, 2008, 20 pages.
Reply Brief Under 37 C.F.R. 41.41 for U.S. Appl. No. 11/041,882, date mailed Apr. 7, 2008, 18 pages.
Office Communication for U.S. Appl. No. 11/041,882, date mailed Jun. 18, 2008, 3 pages.
Board of Patent Appeals and Interferences Docketing Notice for U.S. Appl. No. 11/041,882, date mailed Jan. 23, 2009, 2 pages.
Examination Report under Section 18(3) for Application No. GB0616689.6, date of report Feb. 25, 2008, 1 page.
International Search Report and Written Opinion for International Application No. PCT/US2009/068735, date mailed Apr. 19, 2010, 11 pages.
Canadian Office Action for Canadian Application No. 2,554,133 dated Aug. 6, 2012, 3 pages.

* cited by examiner

LAVATORY SYSTEM

CROSS-REFERENCE TO RELATED PATENT APPLICATIONS

The present application is a continuation of, and claims the benefit of priority as available under 35 U.S.C. §121 to, copending U.S. patent application Ser. No. 11/041,882, having a filing date of Jan. 21, 2005, titled "LAVATORY SYSTEM," which claims the benefit under 35 U.S.C. 119(e) of U.S. Provisional Application No. 60/538,583, having a filing date of Jan. 23, 2004, titled "LAVATORY SYSTEM," and which claims the benefit under 35 U.S.C. 119(e) of U.S. Provisional Application No. 60/602,585, having a filing date of Aug. 18, 2004, titled "LAVATORY SYSTEM," the entire disclosures of which are hereby incorporated herein by reference.

FIELD

The present inventions relate generally to a lavatory system. The present inventions also relate to a lavatory system having a control system suitable for providing "hands-free" operation of one or more fixtures (e.g., sprayheads, faucets, showerheads, soap or lotion dispensers, hand dryers, flushers for toilets and/or urinals, emergency fixtures, etc.) within the lavatory system. The present inventions further relate to a lavatory system having a photovoltaic system for providing electrical energy one or more electronic fixtures within the lavatory system and/or for providing electrical energy to a control system coupled to the fixtures.

BACKGROUND

It is generally known to provide a lavatory system having at least one fixture that conventionally requires manual manipulation by a user in order to operate. It is further known to provide an electrical and/or electronic control system with such a fixture for providing "hands-free" operation of the fixture. Not requiring a user to physically contact or touch the fixture for its operation may be desirable for various sanitary and/or accessibility considerations.

A power source is necessary when using an electronic and/or electrical control system to control a fixture. When available and desirable, power is commonly provided by an AC power line. However, when not available or not desirable, alternative power sources are utilized. Known alternative power sources include energy storage elements such as batteries and capacitors. However, control systems that use such energy storage elements have disadvantages, including having a power source with a relatively finite operating life that often must be periodically changed, reenergized, or otherwise maintained.

It would be advantageous to provide a lavatory system for use in commercial, educational, or residential applications, having one or more fixtures and a control system for enabling "hands-free" operation of the fixtures wherein the control system is powered by means other than an AC power line (e.g., energy storage element, etc.). It would also be advantageous to provide a control system for use with a lavatory system that can prolong the operating life of an energy storage element by reducing or minimizing the required power consumption of the control system. It would further be advantageous to provide a control system that minimizes or reduces power consumption by increasing the speed at which the control system processes a signal representative of the environment near the fixture (a sensing region). It would further be advantageous to provide a lavatory system having a photovoltaic system that can provide electrical energy to a control system and/or a fixture of the lavatory system. It would further be advantageous to incorporate photovoltaic cells into the support structure of a lavatory system (such as a usable surface). It would further be advantageous to provide a power management system providing for the efficient use of electrical energy generated by a photovoltaic system.

Accordingly, it would be desirable to provide for a lavatory system having one or more of these or other advantageous features.

SUMMARY

The present invention relates to a lavatory system including a first wash station having a first fluid dispensing fixture and a first drain, a second wash station having a second fluid dispensing fixture and a second drain, a support structure extending between the first wash station and the second wash station and at least one array of photovoltaic cells supported at the support structure. The at least one array of photovoltaic cells is configured to provide power for operating both the first fluid dispensing fixture and the second fluid dispensing fixture.

The present invention also relates to lavatory system providing at least one wash station. The lavatory system includes at least one basin, at least one fixture supported at the at least one basin, support structure having a first portion to which the at least one fixture is coupled and a second portion comprising a countertop and at least a first and second group of photovoltaic cells supported at the countertop and configured to provide power for the at least one fixture. The first group of photovoltaic cells being visually separated from the second group of photovoltaic cells by the countertop.

The present invention also relates to a lavatory system providing at least one wash station. The lavatory system includes at least one basin, at least one fixture supported at the at least one basin, a support structure having a first portion to which the at least one fixture is coupled and a second portion comprising a countertop and at least one photovoltaic cell supported at the countertop and configured to provide power for operating the at least one fixture. A top surface of the at least one photovoltaic cell does not extend above a top surface of the countertop so that a continuous support surface is provided.

DETAILED DESCRIPTION

Figure 1:
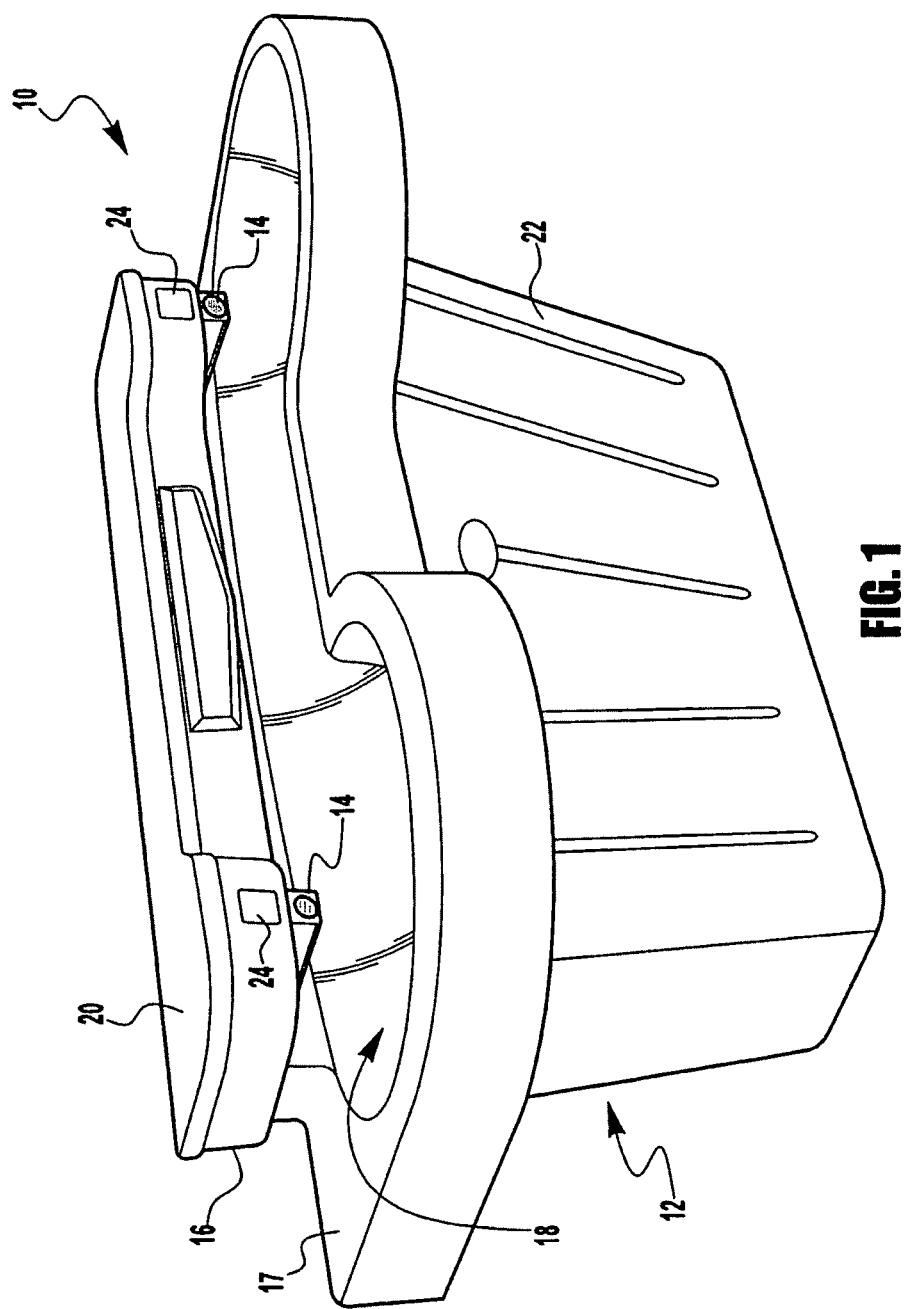
FIG. 1 is a perspective view of a lavatory system according to an exemplary embodiment, shown as a washing station.

Referring generally to the FIGURES, a lavatory system 10 with components is shown according to exemplary embodiments. FIG. 1 shows lavatory system 10 as a washing station suitable for providing a cleansing area for one or more users. Lavatory system 10 is shown as including a pair of fixtures 14 having outlets (e.g., nozzles, diffusers, etc.) directed towards a basin 18 which is supported by a base or a support structure 12. Support structure 12 is provided an upper portion 16 by which fixtures 14, and/or other components, may be placed upon or coupled thereto. Upper portion 16 is further shown as including a platform or shelf 20 which provides a relatively flat surface (e.g., ledge, countertop, etc.) that can be used by a user to conveniently hold various objects (e.g., toiletries, beverage containers, personal items, etc.).

Figure 8:
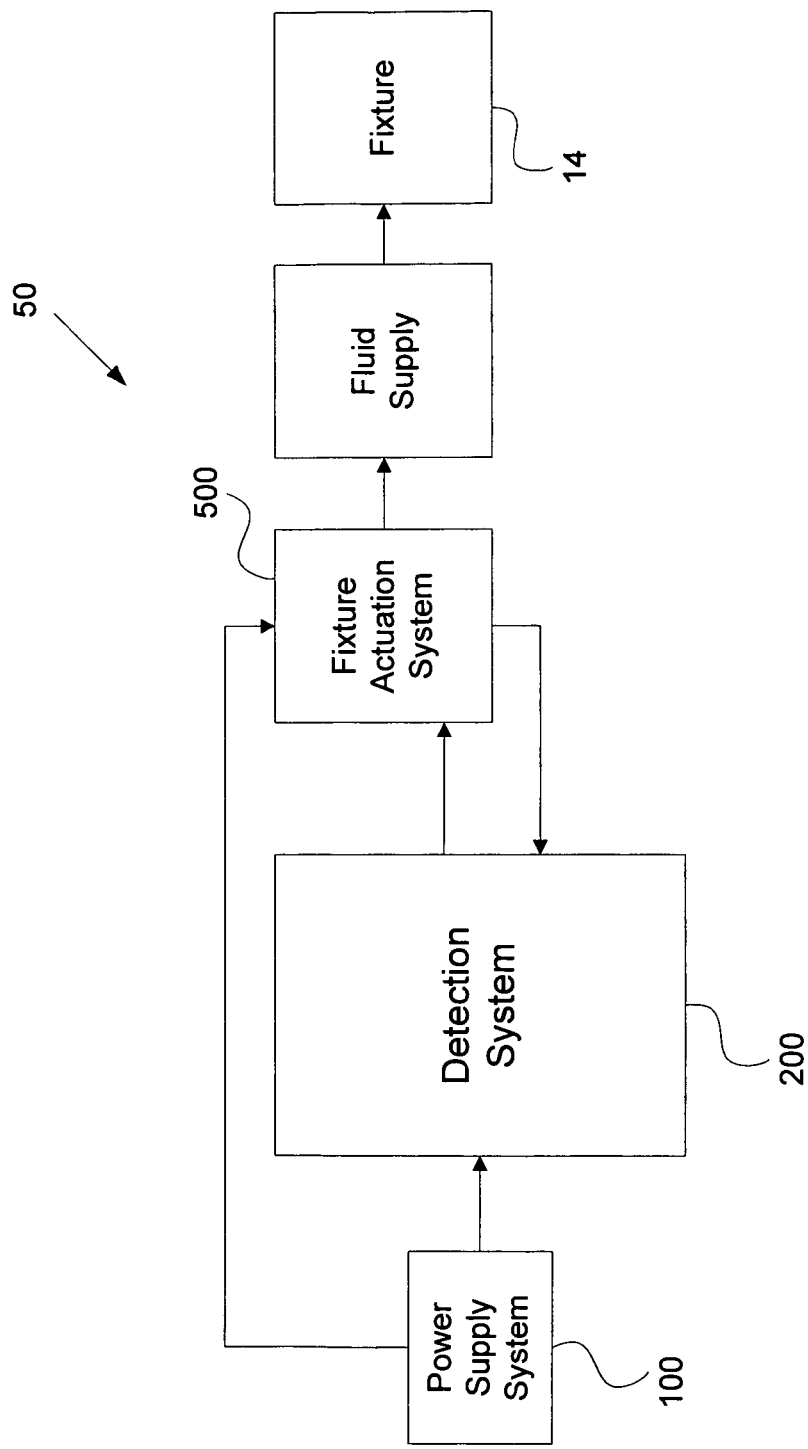
FIG. 8 is a schematic block diagram a control system for use with the lavatory system shown in FIG. 1 to provide for the operation of the fixtures.
Figure 9:
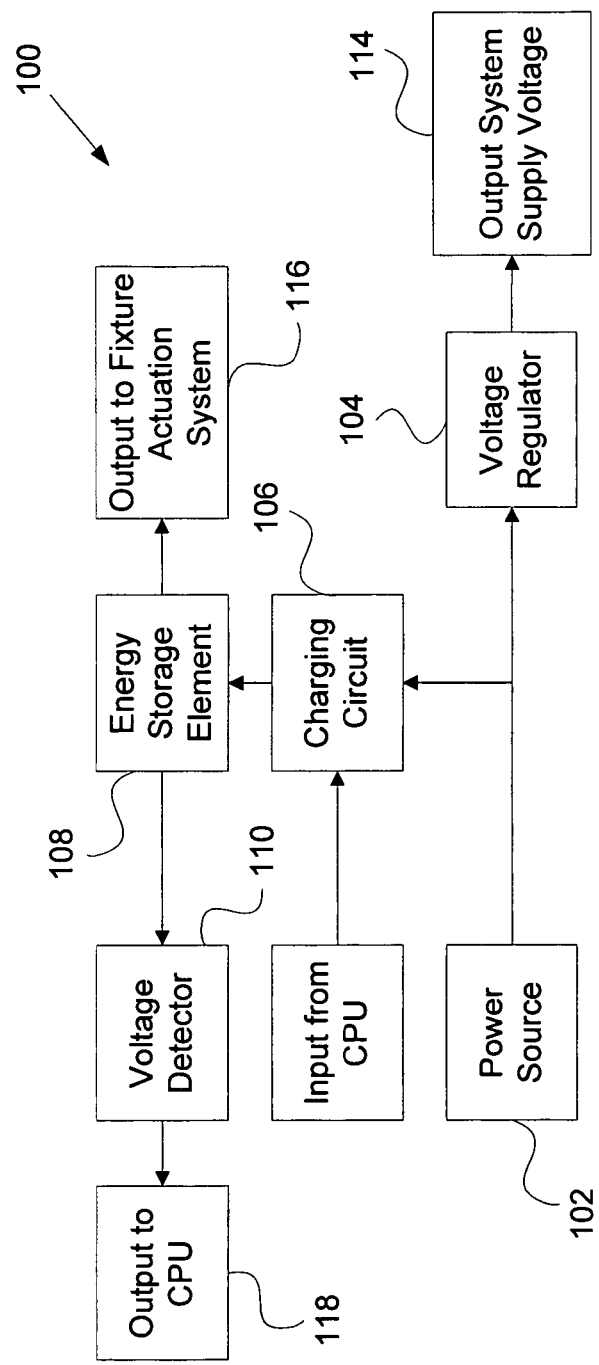
FIG. 9 is a schematic block diagram of a power supply system of the control system shown schematically in FIG. 8 according to an exemplary embodiment.

According to an exemplary embodiment, lavatory system 10 includes a control system 50 for controlling the operation of fixtures 14. Preferably, fixtures 14 are "touchless" fixtures meaning that a user can operate the fixtures without physically contacting the fixtures and/or an interface coupled to the fixtures (i.e., "hands-free" operation). In this manner, lavatory system 10 can overcome sanitation and/or accessibility limitations often associated with conventionally used fixtures. Control system 50 monitors a defined sensing region (an area adequately proximate to fixtures 14 in which a user of the fixture is likely to be positioned) for the presence of an object (e.g., a user, etc.) and controls the operation of fixtures 14 accordingly. FIG. 8 shows a block diagram representative of control system 50 according to an exemplary embodiment. Control system 50 includes a power supply system 100, a detection system 200, and a fixture actuation system 500. Control system 50 is configured to reduce power consumption in an effort to prolong the useful operating life of a power source having an finite operating life (such as a battery). Power consumption is reduced by shortening the time interval (i.e., a sample period) for which detection system 200 is monitoring the sensing region and by increasing a speed at which detection system 200 processes a signal representative of status of the sensing region. Increased processing speed allows detection system 200 to take extended "sleep periods" which conserve power. "Sleep periods" include periods wherein detection system 200 is substantially not consuming any power, and/or periods wherein detection system 200 is consuming a reduced amount of power.

Figure 2:
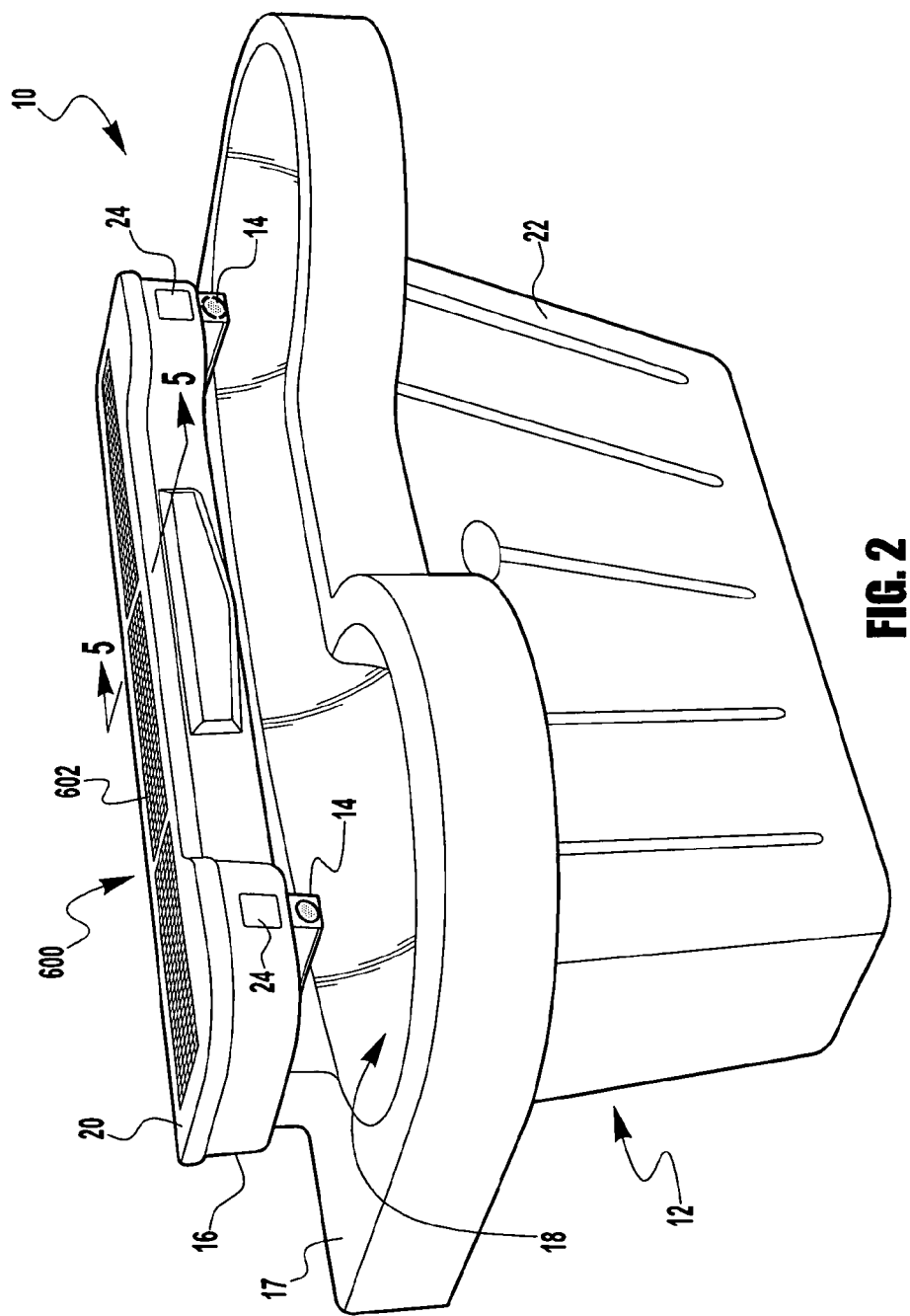
FIG. 2 is a perspective view of a lavatory system having a photovoltaic system according to an exemplary embodiment.

According to another exemplary embodiment, lavatory system 10 includes a photovoltaic system 600 capable of converting light energy to electrical energy. Photovoltaic system 600 can be used to power fixtures 14 and/or a control system providing for the "hands-free" operation of fixtures 14 (such as control system 50). FIGS. 2 through 4 and 16 through 17 show photovoltaic system 600 and components thereof according to exemplary embodiments. Referring particularly to FIG. 2, photovoltaic system 600 is shown as including one or more photovoltaic cells 602 (such as an array of cells) coupled to support structure 12 of lavatory system 10. Photovoltaic cells 602 may be supported by, mounted to, contained within, and/or integrally formed with a portion of support structure 12. Preferably, photovoltaic cells 602 are provided at shelf 20 of upper portion 16 of support structure 12 in an effort to maximize the exposure of photovoltaic cells 102 to the ambient light. Preferably, the addition of photovoltaic cells 602 to shelf 20 does not significantly limit the functionality of shelf 20 as a usable surface for a user.

Figure 17:
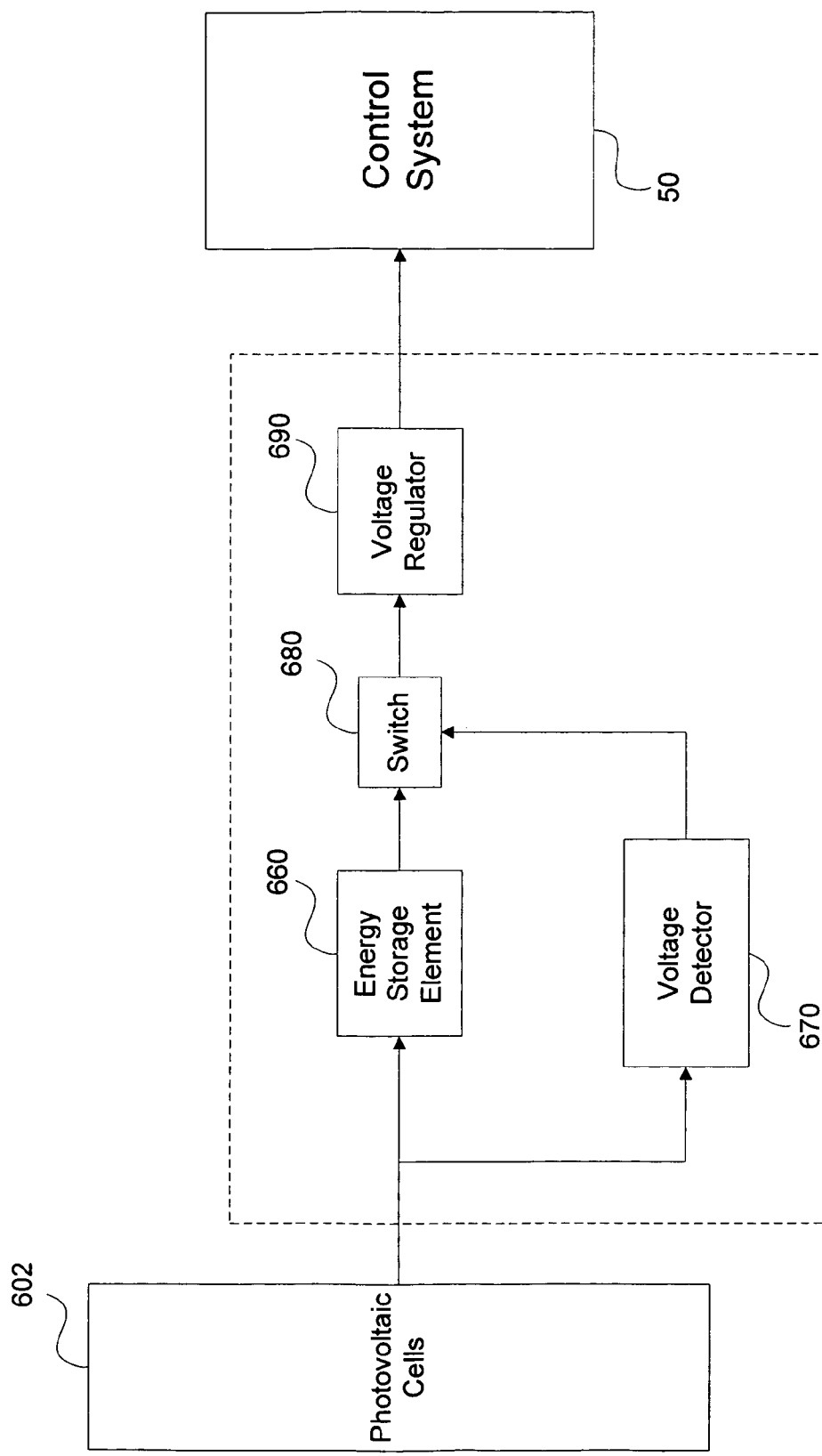
FIG. 17 is a detailed schematic block diagram of a power management system of the photovoltaic system of FIG. 16 according to an exemplary embodiment.

Photovoltaic cells 602 are electrically coupled to fixtures 14 and/or a control system providing for the operation of fixtures 14. According to an exemplary embodiment, photovoltaic system 600 further includes a power management system 650 providing for an efficient use of the electrical energy generated by photovoltaic cells 602. FIG. 17 shows power management system 650 and components thereof according to an exemplary embodiment. Power management system 650 generally includes an energy storage element 660 configured to receive and store electrical energy generated by photovoltaic cells 602, a detector (shown as a voltage detector 670) for monitoring the level of ambient light surrounding lavatory system 10 (e.g., by monitoring the energy stored in energy storage element 660, etc.) to recognize periods of time when it is unlikely that lavatory system 10 will be used (e.g., when the ambient light is turn off or otherwise reduced), a switch 680 capable of electrically disconnecting energy storage element 660 from control system 50 when voltage detector 670 sends an output signal indicating that given the level of ambient light surrounding lavatory system 10 it is unlikely that lavatory system 10 will be used, and a voltage regulator 690 for adjusting the voltage being sent to control system 50. According to various alternative embodiments, power management system may be used without photovoltaic cells 602 to electrically disconnect an energy storage element (such as a battery) from control system 50.

Referring back to FIG. 1, lavatory system 10, is intended for commercial, educational, medical, and/or residential use and to be readily installed in a number of locations and environments including, but not limited to, restrooms, locker rooms, break rooms, surgical prep rooms, kitchens, or the like. For purpose of this disclosure, the phrase "lavatory system" is used generally to refer to any cleansing or other sanitary system or station, and is not intended to be limited to the washing station shown. For example, the various alternative embodiments of lavatory system 10 may include, but are not limited to, toilets, urinals, showers, wash fountains, emergency wash stations (e.g., drench showers, eye wash systems, etc.), or alternative washing stations.

Fixtures 14, shown as a pair of sprayheads, are configured for directionally dispensing (e.g., spraying, discharging, spending, etc.) a fluid (e.g., water, etc.). According to various alternative embodiments, lavatory system 10 may include a variety of other fixtures instead of, or in combination with, fixtures 14 including, but not limited to, faucets, soap or lotion dispensers, hand dryers, showerheads, flushers for toilets and/or urinals, emergency fixtures, etc. Fixtures 14 are shown coupled to support structure 12, but alternatively may be supported relative to lavatory system 10. For example, according to an alternative embodiment, fixtures 14 may be coupled to a structure such as a wall or partition rather than support structure 12. According to a preferred embodiment, fixtures 14 are coupled to upper portion 16 of support structure 12 with their outlets directed in an outwardly and downwardly manner towards basin 18.

Fixtures 14 are adapted for being in fluid communication with a fluid supply via a conduit system (not shown) which is likely to include one or more sections of piping or tubing. Each fixture 14 may be independently coupled to a fluid supply, or alternatively, may be coupled to a common or shared fluid supply (e.g., through use of a manifold, etc.). Preferably lavatory system 10 is a multiple station lavatory system wherein fixtures 14 are sufficiently spaced apart in a lateral direction relative to support structure 12 for providing more than one cleansing area. According to various alternative embodiments, any number of fixtures 14 may be used for providing any number of cleansing areas.

Lavatory system 10 further includes a fluid collection receptacle (shown as wash basin 18) for collecting fluid that is discharged from fixtures 14. Wash basin 18 is likely to include one or more fluid drains 19 (shown in FIG. 3) which allow wash basin 18 to be emptied of fluid collected therein. Preferably, wash basin 18 is a substantially continuous receptacle for servicing both fixtures 14, but alternatively, may be provided as a divided receptacle, or further still, as two separate or isolated receptacles (one for each fixture 14). Wash basin 18 is surrounded by a relatively flat surface (e.g., platform, ledge, countertop, tabletop, etc.), shown as a deck 17. Deck 17 may be integrally formed with wash basin 18 (provided as a one-piece member), or alternatively, may be a separate component. According to various alternative embodiments, fixtures 14 may be coupled to deck 17, which can also be used to support a variety of other fixtures. Wash basin 18 is shown as being supported by support structure 12, but according to an alternative embodiment, may be supported by a partition or any other suitable wall structure.

Support structure 12 is shown as including upper portion 16 and a lower portion 22. Upper portion 16 is positioned above wash basin 18 and is provided with shelf 20. Lower portion 22 is configured to at least partially support deck 17 and/or wash basin 18. Preferably, lower portion 22 is configured to conceal the conduit system fluidly coupling fixtures 14 to the fluid supply. Lower portion 22 may include one or more access panels (such as a cabinet door) for allowing access to the components of lavatory system 10 (e.g., conduit system, fixture control system, etc.). According to various alternative embodiments, lower portion 22 may be eliminated if deck 17 and/or wash basin 18 can be sufficiently supported by other means, such as by mounting deck 17 and/or wash basin 18 to a wall in a cantilever manner and/or by supporting deck 17 and/or wash basin 18 with a structure provided from above lavatory system 10.

FIGS. 8 through 16 show control system 50 and components thereof according to exemplary embodiments. Control system 50 provides for the "hands-free" operation of fixtures 14. Control system 50 is a relatively "low" power system that is configured to avoid false readings that limit the effectiveness of conventional control systems. Control system 50 generally includes power supply system 100, detection system 200, and fixture actuation system 500. Power supply system 100 provides an operating voltage to the various elements/components of control system 50, while detection system 200 monitors an area (i.e., sensing region, zone of detection, etc.) adjacent fixture 14 and provides an output signal to fixture actuation system 500 which in turn activates or deactivates a valve (e.g., a solenoid valve 502) for controlling the flow of a fluid through fixtures 14.

Control system 50 can be mounted to lavatory system 10 in a variety of ways and at a variety of positions. Preferably, the majority of the circuitry of control system 50 is provided beneath wash basin 18 and is concealed from the view of a user by lower portion 22 of support structure 12. According to various alternative embodiments, control system 50 may be provided at a position that is remote from lavatory system 10. A sensory window 24 (shown in FIG. 1) is provided on lavatory system 10 to house and/or protect a transmitter 220 and an receiver 230 of detection system 200. Lavatory system 10 is shown as having a separate sensory window 24 for each fixture 14. According to various alternative embodiments, a common sensory window 24 may be provided for housing and/or protecting components of detection system 200 used to control both fixtures 14. Sensory window 24, in combination with transmitter 220 and receiver 230 of detection system 200, define the sensing region in which an object must enter in order for control system 50 to activate fixtures 14. The size of the sensing region can be varied depending on the particular application.

Referring particularly to FIGS. 9, 10, 15 and 16, power supply system 100 generally includes a power source 102, a voltage regulator 104, a charging circuit 106, an energy storage element 108, and a voltage detector 110. Power supply system 100 is configured to provide a first output, shown as a system supply voltage 114, for providing electrical energy to components of detection system 200, a second output, shown as a fixture supply voltage 116, for providing electrical energy to fixture actuation system 500, and a third output, shown as a status signal 118, representative of power level of energy storage element 108. According to various alternative embodiments, power supply system 100 may include any number of outputs depending upon the requirements of control system 50 and/or lavatory system 10.

Control system 50 is advantageously configured for use in applications for which access to a conventional AC power line (requiring a hard-wired connection) is not readily available or is otherwise undesirable to use (e.g., not cost effective to access, etc.). While a conventional AC power line may be used alone or in combination as power source 102, preferably power source 102 is an energy storage element having a relatively finite service or operating life such as a battery, a photovoltaic cell energizing a capacitor (shown in FIG. 10), or the like. According to a one embodiment, power source 102 is a lithium battery having a voltage between approximately 4 volts and approximately 7 volts. According to various alternative embodiments, power source 102 may be provided by any suitable battery having a range of suitable voltages, and/or may further include a supplemental (e.g., secondary, etc.), a startup, and/or a backup power source.

According to a particularly preferred embodiment, power source 102 has an output voltage of approximately 7 volts. Voltage regulator 104 is configured to adjust the output voltage of power source 102 to a predetermined operating voltage that is compatible with the components of detection system 200 before the electrical energy is outputted as system supply voltage 114. According to an exemplary embodiment, voltage regulator 104 provides a relatively stable operating voltage of approximately 3.3 volts that is subsequently distributed as system supply voltage 114 to various components of control system 50 requiring electrical energy (shown as system supply voltage inputs 120). According to various alternative embodiments, voltage regulator 104 may be eliminated if the voltage of power source 102 equals the voltage needed for system supply voltage 114.

Fixture supply voltage 116 (the second output voltage of power supply system 100) provides an operating voltage for the activation and deactivation of a valve controlling the flow of a fluid from fixtures 14. Fixture supply voltage 116 is outputted from energy storage element 108, which is preferably provided by a storage capacitor. Energy storage element 108 stores electrical energy until needed to actuate the valve controlling the flow of the fluid from fixtures 14. According to an exemplary embodiment, energy storage element 108 has a capacitance of between approximately 10 millifarads (mF) to approximately 10 F. According to a preferred embodiment, energy storage element 108 is provided by a single super capacitor having a capacitance of approximately 60 mF, but alternatively, may be provided by a plurality of capacitors (the combination of which provides the desired capacitance and voltage rating). According various alternative embodiments, energy storage element 108 may be configured to have a variety of capacitances depending upon the particular application.

To ensure that energy storage element 108 contains a sufficient amount of electrical energy to turn fixtures 14 on and/or off (i.e., enough electrical energy to actuate a solenoid valve 502), voltage detector 110 is provided for monitoring the power level of energy storage element 108. Voltage detector 110 monitors energy storage element 108 to ensure that the voltage of energy storage element 108 does not drop below a preset threshold or baseline voltage. According to a preferred embodiment, the baseline voltage of energy storage element 108 is set at approximately 4.5 volts (meaning that if the voltage of energy storage element 108 drops below 4.5. volts, energy storage element will be charged sufficiently charged).

Voltage detector 110 sends status signal 118 (the third output of power supply system 110) to detection system 200, preferably a computing device (shown as a central processing unit (CPU) 240) of detection system 200, representative of power level of energy storage element 108. If status signal 118 indicates that the power level of energy storage element 108 has dropped below the preset baseline voltage, CPU 240 sends an output signal 122 to charging circuit 106 which is in turn activated to charge energy storage element 108. Power supply system 100 may optionally include an indicator 112 (shown in FIGS. 12 and 13) to provide for a visual display (e.g., a continuous or flashing light, etc.) when energy storage element 108 is being charged by charging circuit 106.

Referring generally to FIGS. 11 through 13, 15, and 16, detection system 200 generally includes a computing device (shown as a central processing unit (CPU) 240) and a sample and hold circuit 210 to which a sensory device with a transmitter 220 and a receiver 230 is connected thereto. Detection system 200 further includes a pulse regulator circuit 260 for shortening the time interval of the sample period. Detection system 200 monitors the sensing region and provides output signal to fixture actuation system 500 indicating whether solenoid valve 502 should be opened or closed.

Figure 11:
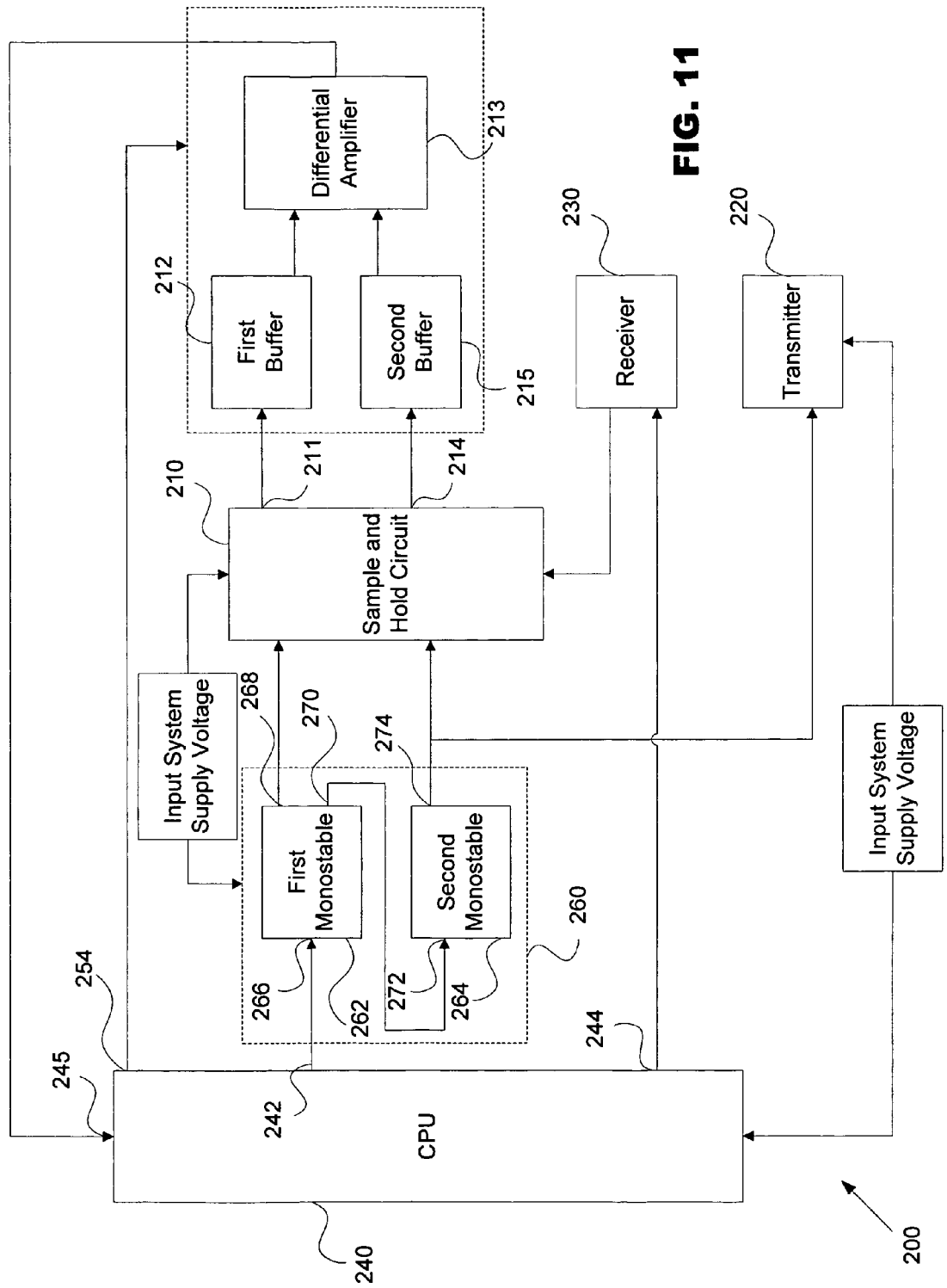
FIG. 11 is a schematic block diagram of a detection system of the control system shown schematically in FIG. 8 according to an exemplary embodiment.
Figure 15:
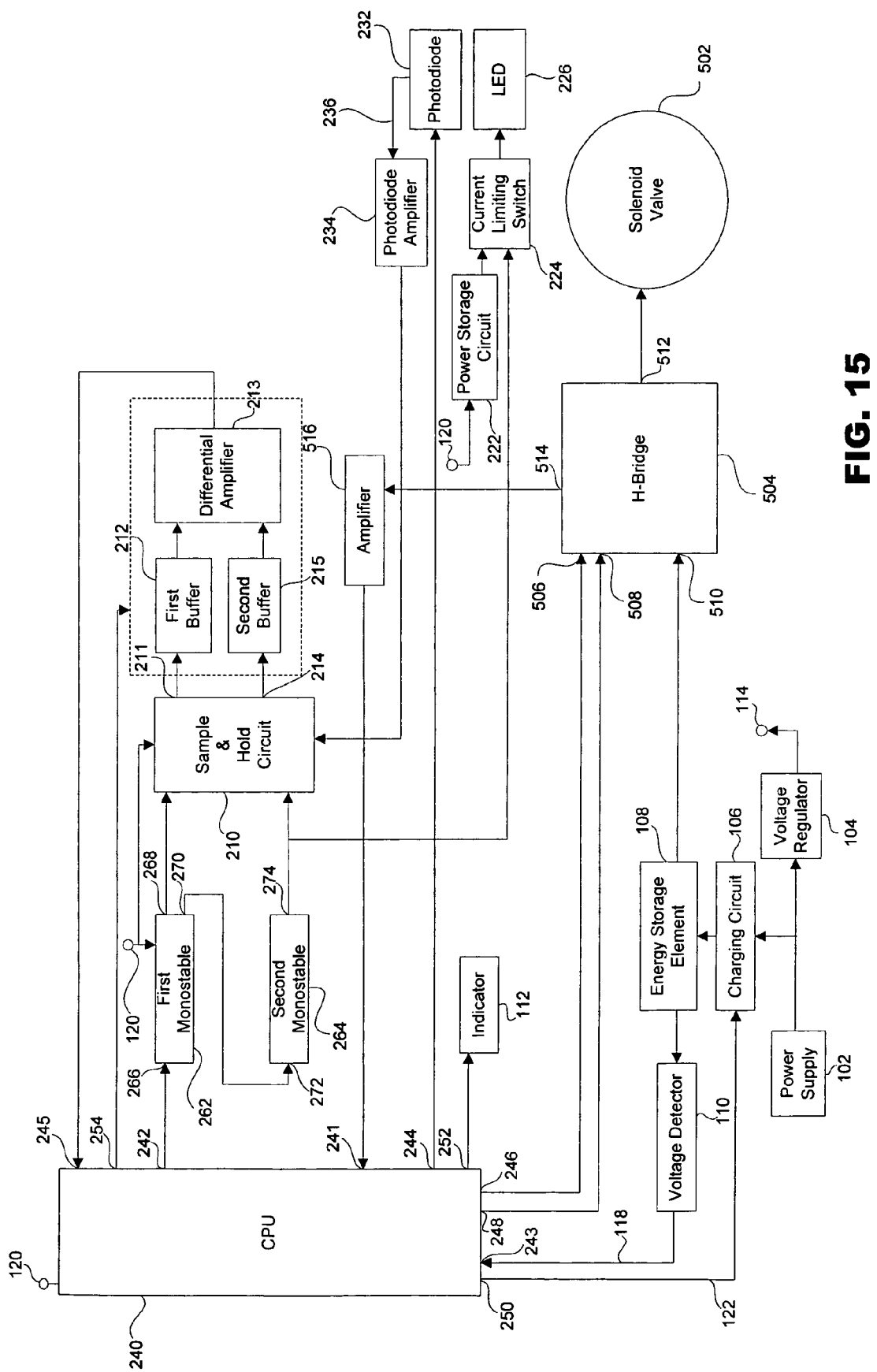
FIG. 15 is a detailed schematic block diagram of the control system of FIG. 8 according to an exemplary embodiment.

Referring particularly to FIGS. 11 and 15, CPU 240 is configured to support and execute a program to control the components of control system 50. CPU 240 is powered by system supply voltage 114 and is shown as having a first output 242 for controlling transmitter 220, a second output 244 for sending an operating voltage to receiver 230, a third output 246 for providing a "valve closed" signal to fixture actuation system 500, a fourth output 248 for providing a "valve open" signal to fixture actuation system 500, a fifth output 250 for controlling charging circuit 106 of power supply system 100, a sixth output 252 for activating indicator 112 when charging circuit 106 is charging energy storage element 108, and a seventh output 254 for providing an operating voltage to components of detection system 200. CPU 240 is further shown as having a first input 241 representative of the operating state of fixtures 14, a second input 243 representative of the voltage level of energy storage element 108, and a third input 245 representative of the level of infrared light within the sensing region. According to various alternative embodiments, CPU 240 may include any number of outputs and inputs to meet the requirements of the particular application.

CPU 240 is configured to operate at a relatively fast processing speed in comparison to CPUs used in known control systems which also rely upon a power source having a relatively finite operating life. By utilizing a CPU having a relatively fast processing speed, control system 50 is able to conserve power. Although a faster CPU requires more power than conventionally used CPUs (those having a clock rate of less than 32 kHz), the faster CPU is able to process third input 245 and compare that value with an established baseline value to determine what output (third output 246 or fourth output 248), if any, should be sent to fixture actuation system 500 faster than conventionally used CPUs.

According to an exemplary embodiment, CPU 240 has a clock rate greater than approximately 32 kilohertz (kHz). According to a preferred embodiment, CPU 240 has a clock rate within the range of approximately 32 kHz to approximately 20 megahertz (MHz). According to a particularly preferred embodiment, CPU 240 has a clock rate of approximately 4 MHz. Since a 4 MHz CPU can process and compare the signal faster than a 32 kHz CPU, the sleep period of the 4 MHz CPU will be longer than that of the 32 kHz CPU. A longer sleep period will prolong the operating life of energy storage element 108. The sleep period may include periods wherein CPU 240 requires substantially no power and/or periods wherein CPU 240 requires a reduced amount of power. For example, CPU 240 may be configured to operate between varying frequencies rather than just between an "on" and "off" operational state. Accordingly, CPU 240 may have a clock rate of 4 MHz while a sample of the sensory region is being obtained, while having a clock rate of only 32 kHz between sampling periods to allow for reduced power consumption. In such a configuration, the period during which the 4 MHz CPU operated at 32 kHz may constitute the sleep period.

Referring generally to FIGS. 11 through 13, 15, and 16, transmitter 220 is configured to emit a signal into the sensing region, while receiver 230 is configured to measure (e.g., capture, monitor, etc.) the signal in the sensing region. Preferably, transmitter 220 is configured to emit pulses of infrared light into the sensing region, while receiver 230 is configured to measure the level of infrared light in the sensing region. According to various alternative embodiments, transmitter 220 and receiver 230 may be configured as a radar sensor, a sonar sensor, or any other suitable sensory device.

Receiver 230 may be operated independently of transmitter 220 (to measure a background level of infrared light) and/or may be operated in conjunction with transmitter 220 (to measure the amount of reflected infrared light in the sensing region to detect the presence of an object (e.g., a user)). When a user enters the sensing region, at least a portion of the infrared light emitted from transmitter 220 will be reflected by the user and detected by receiver 230. A signal representative of the level of infrared light in the sensing region is sent to CPU 240 which in turn uses the signal to determine whether fixture actuation system 500 should be actuated. If an object is detected, CPU 240 will send a signal from output 248 to fixture actuation system 500 to activate a valve (e.g., solenoid valve 502) allowing for the flow of a fluid from at least one of fixtures 14.

Figure 12:
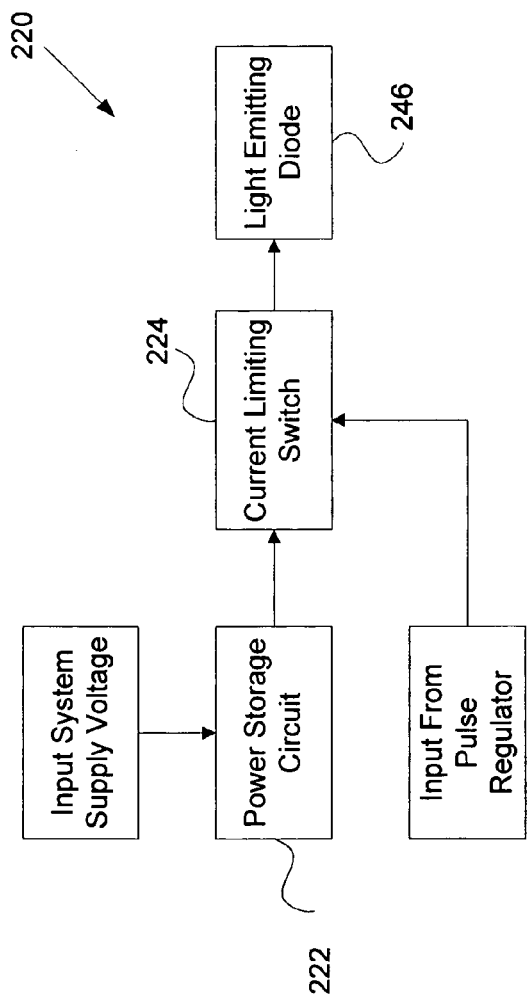
FIG. 12 is a schematic block diagram of a transmitter of the control system shown schematically in FIG. 11 according to an exemplary embodiment.

Referring particularly to FIG. 12, transmitter 220 is shown as including a power storage circuit 222, a current limiting switch 224, and an light emitting diode (LED) 226. Power storage circuit 222 receives and stores a sufficient amount of power for activating LED 226. According to an exemplary embodiment, power storage circuit 222 includes a capacitor that is charged by system supply voltage 114 outputted by power supply system 100. Current limiting switch 224 is provided for regulating the maximum current being provided to LED 226. According to an exemplary embodiment, current limiting switch 224 limits the current going to LED 226 to between approximately 700 and 800 milliamps.

According to an exemplary embodiment, one transmitter 220 having one LED 226 is provided for each fixture 14. According to various alternative embodiments, any number of transmitters 220 (having any number of LEDs 226) can be used to emit pulses of infrared light into the sensing region of the respective fixture 14. According to an exemplary embodiment, LED 226 is supported at a position above fixtures 14 so that a fluid flow discharging from fixtures 14 does interfere with (e.g., reflect, etc.) the pulses of infrared light being emitted by LED 226. Preferably, LED 226 is protected behind sensory window 24 (see FIGS. 1 and 2) that is provided in upper portion 16 of support structure 12. The placement of LED 226 and/or sensory window 24 and the method of supporting LED 226 and/or sensory window 24 relative to support structure 12 may change depending on the fixtures and configuration of lavatory system 10.

Figure 13:
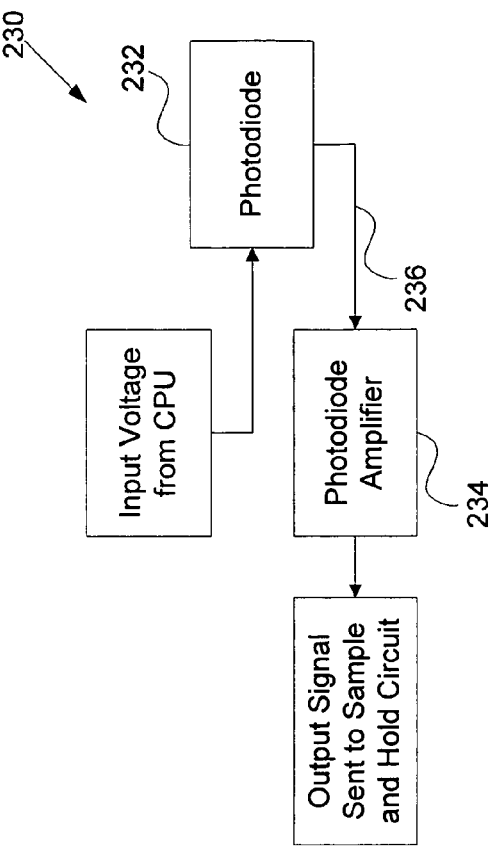
FIG. 13 is a schematic block diagram of a receiver of the control system shown schematically in FIG. 11 according to an exemplary embodiment.

Referring particularly to FIG. 13, receiver 230 is shown as including a photodiode 232 and a photodiode amplifier 234. Photodiode 232 captures the level of infrared light in the sensing region (including levels of infrared light in the ambient light and/or levels of infrared light from transmitter 220). According to an exemplary embodiment, photodiode 232 is positioned adjacent to LED 226. According to various alternative embodiments, receiver 230 may include any number of photodiode 232 for capturing the level of infrared light in the sensing region, and can be positioned near and/or at a distance from LED 226. Photodiode 232 generates an output signal 236 representative of level of infrared light in the sensing region. Output signal 236 is fed into photodiode amplifier 234, which is configured to amplify the current coming from photodiode 232 (output signal 236) into an analog voltage and to provide buffering for the resultant signal. The analog voltage representative of the level of infrared light in the sensing region is then sent to sample and hold circuit 210.

Figure 16:
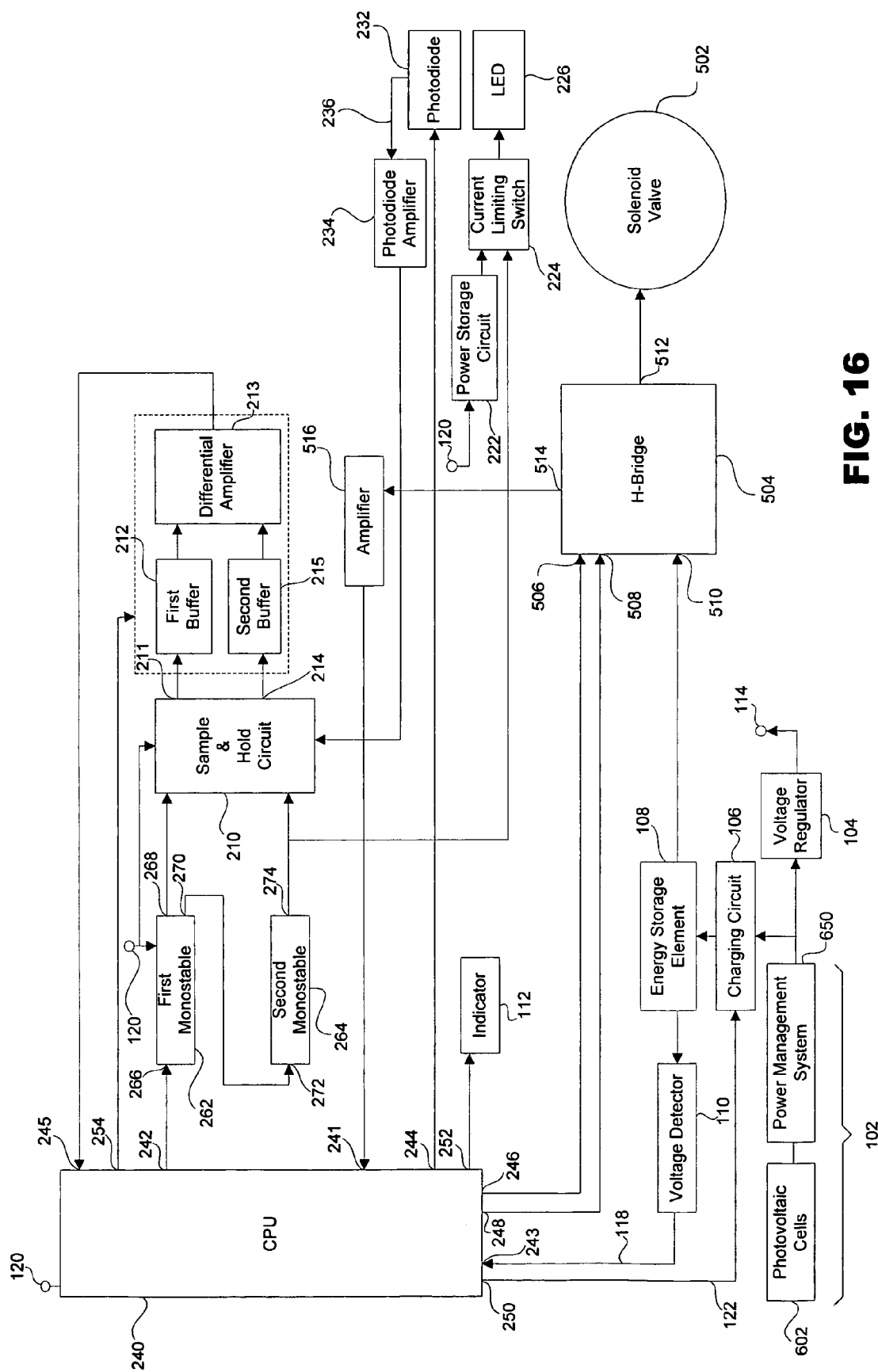
FIG. 16 is a detailed schematic block diagram of the control system of FIG. 8 according to another exemplary embodiment.

Referring to FIGS. 11, 15, and 16, sample and hold circuit 210 is configured to receive and store a first voltage representative of the level of infrared light in the sensing region when transmitter 220 is not activated and a second voltage representative of the level of infrared light in the sensing region when transmitter 220 is activated. Sample and hold circuit 210 is shown as including a first output 211 for outputting the first voltage to a first buffer 212 and subsequently a difference amplifier 213. Sample and hold circuit 210 is further shown as including a second output 214 for outputting the second voltage to a second buffer 215 and subsequently difference amplifier 213. Sample and hold circuit 210 includes one capacitor and one corresponding switch for each the first voltage (representative of the level of infrared light in the sensing region when transmitter 220 is not activated) and the second voltage (representative of the level of infrared light in the sensing region when transmitter 220 is activated). Preferably, the storage capacitors of sample and hold circuit 210 are relatively small so that the capacitors can charge quickly thereby allowing the input signals from photodiode amplifier 234 to be continually recognized. According to a particularly preferred embodiment, storage capacitors having a capacitance of approximately 1000 picofarads (pF) are used for the storage capacitors of sample and hold circuit 210. According to various alternative embodiments, storage capacitors having other capacitances may be used.

Referring still to FIGS. 11, 15, and 16, pulse regulator 260 establishes the time interval of a sample period for sample and hold circuit 210. For purposes of this disclosure, the term "sample period" is used generally to refer to the period of time needed for sample and hold circuit 210 to capture and hold both the background level of infrared light and the background level of infrared light plus the reflected level of infrared light. Pulse regulator 260 provides for a shorten sample period (a sample period of approximately 1.5 microseconds (µs)) that advantageously allows lavatory system 10 to be used in environments wherein the ambient light and/or other signal transmitters at least periodically emit levels of infrared light. For example, it is generally known to use fluorescent lamps having a frequency range between 50 Hertz (Hz) and 110 kilohertz (kHz). If a measurement of the sensing region is taken over a relatively long period of time, the measurement may include a high peak value and a low peak value of the fluorescent light which may cause control system 50 to misinterpret the change in the level of infrared light in a sensing region. Shortening the sample period decreases the likelihood of a false reading caused by interfering infrared light.

Pulse regulator 260 is shown as generally including a first monostable 262 and a second monostable 264. First monostable 262 includes an input 266 for receiving a signal from output 242 of CPU 240 for starting a timing period, a first output 268 for sending a signal to sample and hold circuit 210, and a second output 270 for providing a signal to second monostable 264. Second monostable 264 includes an input 272 for receiving a signal from second output 270 from first monostable 262 and an output 274 for providing a signal to sample and hold circuit 210 and transmitter 220. Together, first monostable 262 and second monostable 264 provide a dual monostable multivibrator between an output pulse from CPU 240 and transmitter 220 for shortening the sample period.

Figure 14:
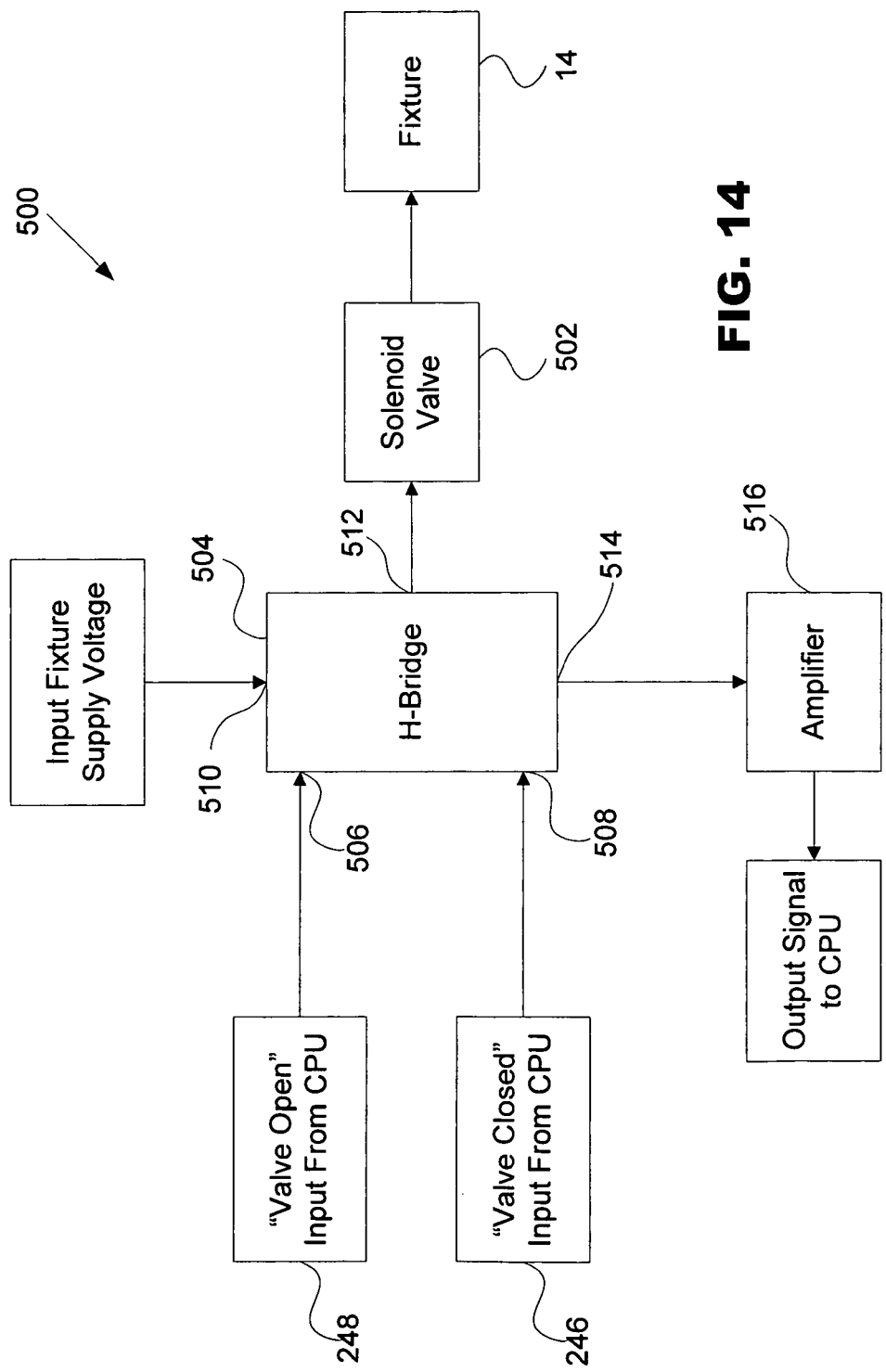
FIG. 14 is a schematic block diagram of a fixture actuation system of the control system shown schematically in FIG. 8 according to an exemplary embodiment.

Referring particularly to FIGS. 14 through 16 fixture actuation system 500 receives an input signal from detection system 200 indicating whether to change the operating state of fixtures 14. Fixture actuation system 500 is shown as generally including a valve, shown as a solenoid valve 502, fluidly coupled to a fluid line between the fluid source and the outputs of fixtures 14. Solenoid valve 502 switches between an first or open position, wherein fluid is able to discharge from fixtures 14, and a second or closed position, wherein solenoid valve 502 is configured to block the fluid line to prevent fluid from discharging from fixtures 14.

According to a preferred embodiment, solenoid valve 502 is a latching valve including a cylinder enclosing a piston having a plunger disposed around a first end and a magnet positioned at the top of the first end. In the closed position, the plunger is seated against a diaphragm to prevent fluid from exiting fixture 14. In the open position, the plunger is unseated from the diaphragm and moved towards the top of the cylinder to allow for the flow of a fluid. The plunger is held in the open position by the magnet.

Fixture actuation system 500 is further shown as including a switching device, shown as an H-Bridge 504, for controlling the positioning of solenoid valve 502 by reversing the polarity of the current sent to solenoid valve 502 from energy storage element 108. H-Bridge 504 is shown as including a first input 506 for receiving the "valve close" signal from output 246 of CPU 240, a second input 508 for receiving the "valve open" signal from output 248 of CPU 240, and a third input 510 for fixture supply voltage 116 from energy storage element 108 of power supply system 100. H-Bridge 504 is further shown as including a first output 512 for providing a signal to solenoid valve 502 and a second output 514 for providing a signal to CPU 240 representative to the operational state of solenoid valve 502. Before reaching CPU 240, the signal passes through an amplifier 516.

According to various alternative embodiments, CPU 240 may be configured for providing "valve open" signal to H-Bridge 504 without providing a "valve closed" signal. In this manner, solenoid valve may be closed by utilizing a timer to control the duration that solenoid valve 502 in the open position.

Operation of control system 50 is described according to a particularly preferred embodiment with reference to lavatory system 10. In operation, CPU 240 supports and executes a program to control the components of control system 50 by performing a series of statuses in a continuous loop. Upon startup, CPU 240 enters an initial status (e.g. power up, startup, etc.) wherein CPU 240 ensures that solenoid valve 502 is in the second or closed position so that fluid is not being discharged from fixtures 14. CPU 240 ensures that solenoid valve 502 is in the closed position by providing the "closed valve" signal from output 246 to H-Bridge 504 of fixture actuation system 500. During this initial status, CPU 240 further receives an input signal (status signal 118) from voltage detector 110 indicating whether energy storage element 108 is sufficiently charged to actuate solenoid valve 502 (e.g., has a voltage of at least 4.5 volts, etc.) or is in need of charging. If the energy level of energy storage 108 is below the preset baseline voltage stored within CPU 240, CPU 240 provides a signal from output 250 to charging circuit 106 indicating that charging circuit 106 should be activated for charging energy storage element 108. Energy storage element 108 should be charged an amount sufficient to provide for multiple actuations of solenoid valve 502. While charging circuit 106 is charging energy storage element 108, CPU 240 sends signal from output 252 to activate indicator 112 to provide for a visual display that energy storage element 108 is being charged.

Once energy storage element 108 is sufficiently charged (registers a voltage greater than approximately 4.5 volts), and solenoid valve 502 is placed in the closed position, detection system 200 establishes a baseline infrared light level for the sensing region that will stored in CPU 240 and which will be compared to later obtained signals to determine if an object is within the sensing region. The baseline infrared light level of the sensing region is established by taking a sensing sample (i.e., comparing the background level of infrared light in the sensing region with the reflected level of infrared light in the sensing region) or a number of sensing samples which is then stored in CPU 240. According to a particularly preferred embodiment, CPU 240 is powered approximately every 0.25 seconds to check the charge on energy storage element 108 and the level of infrared light in the sensing region and adjust the baseline value accordingly.

CPU 240 then enters a status referred to as a sensing cycle. During the sensing cycle, CPU 240 checks the charge of energy storage element 108 and depending upon the charge turns charging circuit 106 on or off. CPU 240 also checks the duration of time it has been since that last activation of solenoid valve 502 to adjust the time interval between sample periods accordingly. According to a particularly preferred embodiment, if solenoid valve 502 has been activated within 30 minutes, a sample of the sensing region will be taken every 0.25 seconds. However, if solenoid valve 502 has not been activated for a period greater than 30 minutes, CPU 240 will take a sample of the sensing region approximately every second in an effort to reduce power consumption. According to various alternative embodiments, CPU 240 may be programmed in a variety of ways in order to minimize power consumption when fixtures 14 have not been in use for extended periods of time.

CPU 240 then detects whether the level of infrared light in the sensing region has changed relative to the baseline value that is stored in CPU 240. Once the level of infrared light in the sensing region changes by a predetermined amount (i.e., an indication that an object is within the sensing region), CPU 240 sends the appropriate output signal (either a signal from output 248 to open solenoid valve 502 or a signal from output 246 to close solenoid valve 502).

During one sensing cycle, CPU 240 sends a signal from output 242 to first monostable 262. Upon receiving a signal from output 242 of CPU 240, first monostable 262 starts a timing period. According to an exemplary embodiment, the start of the timing period closes a first switch of sample and hold circuit 210 (a switch between photodiode amplifier 234 and a first capacitor of sample and hold circuit 210). Once the first switch is closed, photodiode amplifier 234 provides an output voltage representative of the background level of infrared light in the sensing region to the first capacitor of sample and hold circuit 210. At this point, LED 226 of transmitter 220 is not emitting a pulse of infrared light and therefore the only infrared light being detected and captured by receiver 230 is from the ambient light or other sensing signals in the sensing region.

First monostable 262 latches the background infrared level when first output 268 from first monostable 262 goes low. When first output 268 goes low, second output 270 from first monostable 262 goes high which triggers second monostable 264. Upon activation, second monostable 264 provides a signal from output 274 which activates transmitter 220 and closes a second switch of sample and hold circuit 210 (a switch between photodiode amplifier 234 and a first capacitor of sample and hold circuit 210) to store the output voltage coming out of photodiode amplifier 234 (i.e. the output voltage represents the background level of infrared light). The second switch is held closed for a time interval sufficient to provide a control pulse to transmitter 220. According to an exemplary embodiment, the second switch is held closed for a period of approximately 1.5 μs. At the same time, LED 226 of transmitter 220 emits pulses of infrared light into the sensing region. After approximately 1.5 μs, the second switch of sample and hold circuit 210 is opened and LED 226 is turned off. Advantageously, the sample period is therefore accomplished in a relatively short period (i.e. approximately 1.5 μs).

There are two outputs from sample and hold circuit 210 (first output 211 and second output 214). First output 211 outputs the voltage stored in the first capacitor representative of the background level of infrared light (i.e., the level of infrared light in the sensory region when transmitter is not activated). Second output 214 outputs the voltage stored in the second capacitor representative of the background level of infrared light plus the level of infrared light while LED 226 was emitting pulses of infrared light. First output 211 and second output 214 are buffered through their respective buffers 212, 215 and subsequently fed into difference amplifier 213. Out of difference amplifier 213, a voltage representing only the reflected level of infrared light that was measured is provided. That value is fed into input 245 of CPU 240 for comparison with the baseline value stored therein. The value is held long enough by CPU 240 so that CPU 240 can measure the voltage (compare the reflected level of infrared light with the baseline value). According to an preferred embodiment, CPU 240 takes approximately 19 µs to determine whether the reflected level of infrared light is higher than the established baseline value and whether a signal should be sent to fixture actuation system 500.

In comparing the reflected level of infrared light with the baseline value, CPU 240 is programmed to recognize a slight increase in the infrared level as only a drift which can be used to adjust the baseline level. If a large increase in reflected infrared light is detected (e.g. when an object is within the sensing region), CPU 240 sends a signal from output 248 to fixture actuation system 500 to activate solenoid valve 502.

The acquisition of the reflected level of infrared light takes about 1 millisecond (ms). After that period CPU 240 is turned off until the next cycle. According to a preferred embodiment, CPU 240 is turned off for approximately 0.25 seconds. As a result, CPU 240 is on for approximately 1 millisecond (ms) and is off for 250 ms. This is possible because of the shorten sample period for measuring the sensing region (e.g. 1.5 µs). The remainder of the time is due to the power up time of the other components (e.g., photodiode amplifier takes about 100 µs to get a stable output value). Advantageously, control system 50 is conserving power during the 250 ms sleep period. If LED 226 remains on for a longer sample period (e.g., a sample period of 9 µs or greater), LED 226 will undesirably consume more power.

To activate solenoid valve 502, CPU 240 sends a signal from output 248 to H-Bridge 504 indicating that solenoid should be moved to the open position. H-bridge 504 further receives fixture supply voltage 116 from energy storage element 108 of power supply system 100 for providing the necessary electrical energy to move solenoid valve 502. H-bridge 504 flips the polarity of current coming from energy storage element 108 to open solenoid valve 502. According to an exemplary embodiment, solenoid valve 502 will remain open until the "closed valve" signal is sent by CPU 240 (when the level of infrared light measured in the sensing region indicate that a user is no longer present). Control system 50 may optionally include a timer configured to send a signal to H-Bridge 504 indicating that solenoid valve 502 should be moved to the closed position after an established period of time, even if the "closed valve" signal is not sent by CPU 240.

FIGS. 2 through 7, 10, and 16 through 17 show photovoltaic system 600 and components thereof according to exemplary embodiments. Photovoltaic system 600 capable of converting ambient light energy into electrical energy that can be used to power a fixtures 14, and/or a control system coupled to fixtures 14 (such as control system 50). Photovoltaic system 600 generally includes one or more photovoltaic cells 602 configured to convert ambient light energy into electrical energy and a power management system 650 providing for an efficient use of the electrical energy generated by photovoltaic cells 602. FIG. 16 shows photovoltaic system 600 is as power source 102 of power supply system 100 of control system 50.

Referring particularly to FIGS. 2 through 7, photovoltaic system 600 includes one or more photovoltaic cells 602 (e.g., panels, elements, etc.), shown as an array of photovoltaic cells 602, that are capable of converting energy from ambient light into electrical energy. Depending on the particular location of lavatory system 10, ambient light may include artificial light (e.g., fluorescent, incandescent, halogen, etc.), natural light (sunlight), or a combination of artificial and ambient light. Preferably, photovoltaic cells 602 are capable of converting varying wavelengths of light into electrical energy (e.g., artificial light and natural light), but alternatively may be selected for being able to convert particular wavelengths of light into electrical energy. Photovoltaic system 600 represents an alternative power source to an AC power line. Unlike an energy storage element (e.g., a battery), photovoltaic system has a relatively infinite life so long as there is sufficient intensity of ambient light.

Photovoltaic cells 602 are coupled to lavatory system 10 at a position (e.g., location, orientation, etc.) that exposes photovoltaic cells 602 to ambient light, and preferably, at a position that maximizes their exposure to ambient light. Photovoltaic cells 602 may be supported by, mounted to, contained within, and/or integrally formed with a portion of lavatory system 10. Photovoltaic cells 602 may be provided at a variety of positions including, but not limited to, support structure 12, fixtures 14, deck 17, and/or basin 18. According to various alternative embodiments, photovoltaic cells 602 may be positioned at a distance away from lavatory system 10. For example, photovoltaic cells 602 may be provided on a wall, partition, a mirror, etc. and electrically coupled to fixtures 14 and/or control system 50 via a suitable wiring configuration.

According to a preferred embodiment, photovoltaic cells 602 are coupled to a relatively flat surface of lavatory system 10 (e.g., shelf 20, etc.) that is likely to be laterally incident with the ambient light (i.e., perpendicular with the ambient light), but alternatively, may be positioned in any of a variety of positions, angles, and/or orientations depending on the application. According to a further alternative embodiment, photovoltaic cells 602 may be coupled to a curved surface such as a basin 18, and/or a curved ledge or platform.

The configuration of lavatory system 10 (such as size and shape) will likely dictate the locations at which photovoltaic cells 602 will be positioned. FIG. 2 shows photovoltaic cells 602 coupled to lavatory system 10 at a raised (e.g., elevated, heightened, offset, etc.) position relative to the other components of lavatory system 10. Photovoltaic cells 602 are shown coupled to shelf 20 of support structure 12 which is positioned above fixtures 14. Shelf 20 is an elevated surface that is not likely to have a relatively permanent obstruction (e.g., fixture, support structure, etc.) positioned between its top surface and the ambient light source which may limit the exposure of photovoltaic cell 602 to the ambient light source.

Figure 3:
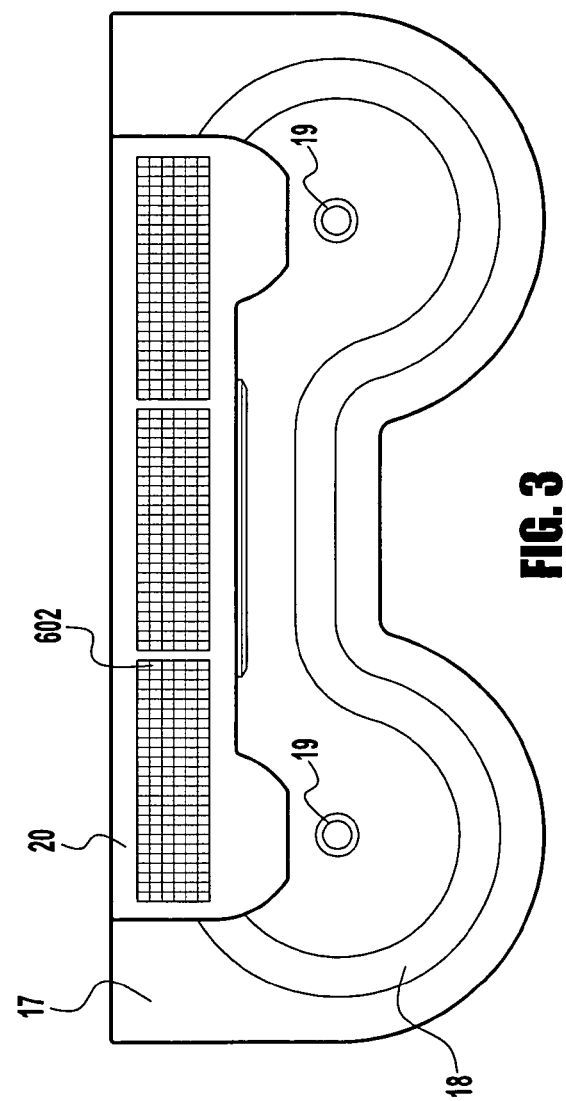
FIG. 3 is a top view of the lavatory system of FIG. 2 showing photovoltaic cells coupled to an upper portion of the lavatory system.

FIG. 3 is a top view of lavatory system 10 showing photovoltaic cells 602 coupled to shelf 20. Photovoltaic cells 602 are shown as being divided into three groups or segments of photovoltaic cells, but alternatively, may be provided as one continuous segment of photovoltaic cells or as individual photovoltaic cells. The number of photovoltaic cells 602 coupled to lavatory system 10 may vary depending on a number of factors including, but not limited, the available surface area of lavatory system 10 capable of accepting photovoltaic cells 602, the power requirements of the control system and/or fixtures 14, the output and efficiency of photovoltaic cells 602, and/or aesthetic considerations.

According to an exemplary embodiment, it is desirable to maximize the number of photovoltaic cells 602 used with lavatory system 10 as is reasonably practical. For example, still referring to FIG. 3, photovoltaic cells 602 cover a substantial portion of the surface area of shelf 20. According to various alternative embodiments, the number of photovoltaic cells 602 used may be limited rather than maximized. The use of commercially available photovoltaic cells 602 (e.g., photovoltaic cells have an established size) may constrain the number of photovoltaic cells coupled to lavatory system 10.

Figure 4:
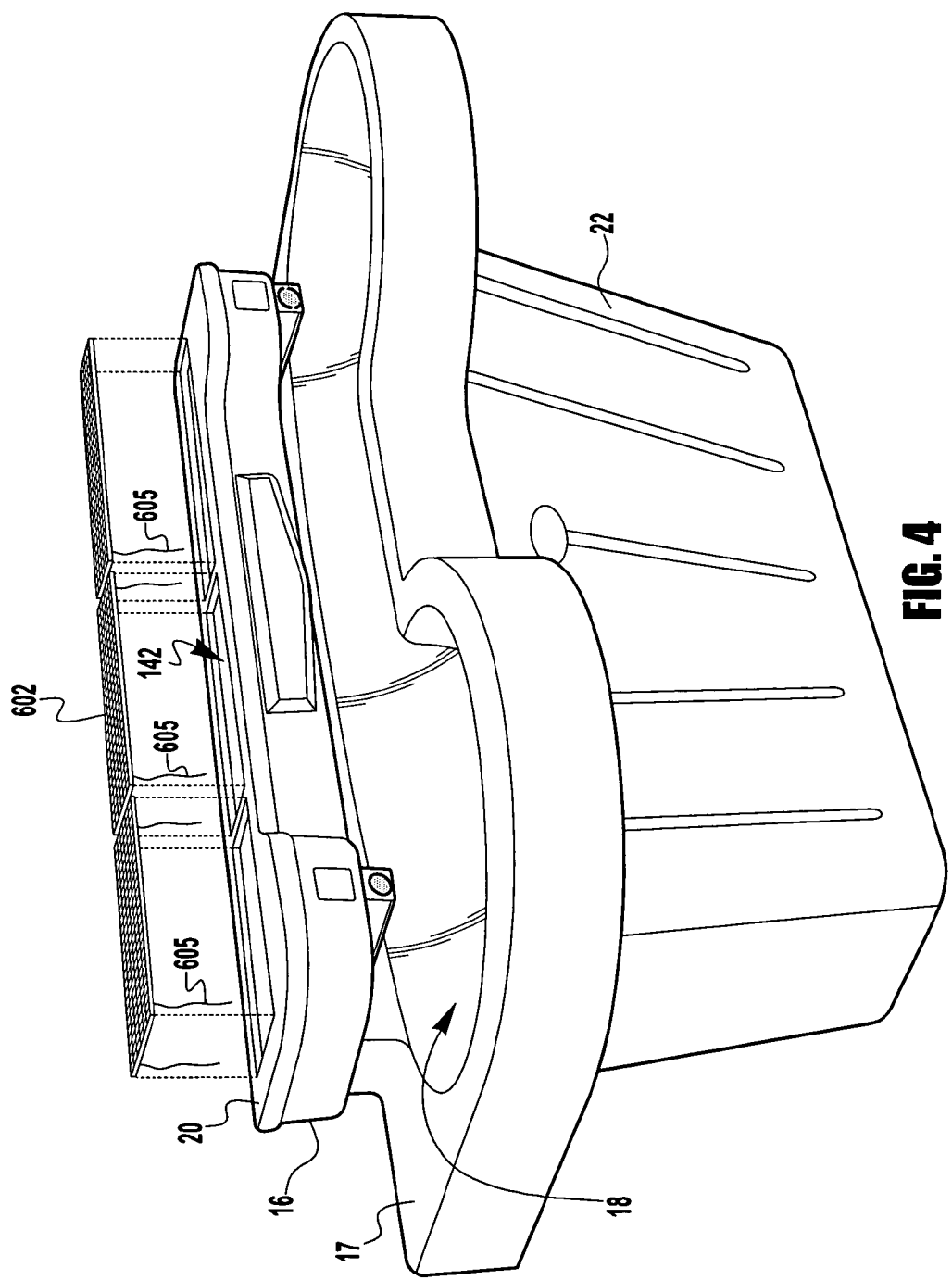
FIG. 4 is a partially exploded perspective view of the photovoltaic system of FIG. 2.
Figure 5:
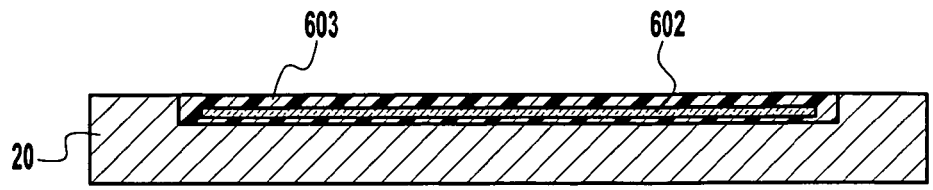
FIG. 5 is a partial cross section view of the lavatory system shown in FIG. 2 taken along the line 5-5.

FIGS. 4 and 5 show a method of coupling photovoltaic cells 602 to lavatory system 10 according to an exemplary embodiment. Referring particularly to FIG. 4, shelf 20 is shown having an aperture (e.g., cavity, opening, channel, depression, etc.), shown as a recess 142, configured to receive photovoltaic cells 602. Shelf 20 may be formed (e.g., molded, cast, manipulated, etc.) with recess 142, or alternatively, material may be removed (e.g., milled, cut, drilled, shaved, etc.) from shelf 20 to provided recess 142. Preferably, recess 142 has a depth sufficient so that when photovoltaic cells 602 are positioned therein, the tops of photovoltaic cells 602 do not outwardly extend above the top surface of shelf 20. Such a configuration may allow for a relatively continuous surface once photovoltaic cells 602 a covered by a suitable coating.

Photovoltaic cells 602 are shown to include wires 605 used to electrically couple photovoltaic cells 602 to fixtures 14 and/or a control system for controlling fixtures 14 or some other component of lavatory system 10. Preferably recess 142 includes an opening for allowing wires 605 to be routed to the desired location while concealing wires 605 from the view of a user.

FIG. 5 shows photovoltaic cells 602 as being coupled to shelf 20 via a relatively clear (e.g., transparent, translucent, etc.) sealer or coating, shown as a resin 603. The coating may include, but is not limited to, an epoxy, a polyester resin, or any other suitable material that can be added to recess 142 for coupling photovoltaic cells 602 and will allow for sufficient levels of ambient light to pass through to photovoltaic cells 602. In such a configuration, photovoltaic cells 602 are substantially integrally formed with shelf 20. Shelf 20 may in turn be permanently coupled to upper portion 16 of support structure 12, or alternatively, may be detachably coupled so that shelf 20 can be readily removed in the in event that photovoltaic cells 602 need to be replaced and/or repaired.

According to an exemplary embodiment, resin 603 is added to recess 142 to couple photovoltaic cells to shelf 20. Preferably, resin 603 is disposed on the tops of photovoltaic cells 602 to provide protection. According to a particularly preferred embodiment, a first layer of resin 603 is disposed between photovoltaic cells 602 and shelf 20 and a second layer of resin 603 is disposed on top of photovoltaic cells. Such a configuration may help maintain the position and/or the integrity of photovoltaic cells 602 as resin 603 is added (e.g., poured, etc.) over the tops of photovoltaic cells 602. After resin 603 is allowed to harden, resin 603 is preferably finished so that resin 603 is substantially even in height with the top surface of shelf 20. According to various alternative embodiments, resin 603 may only be applied over the tops of, along the sides of, and/or beneath photovoltaic cells 602.

According to an alternative embodiment, photovoltaic cells 602 may be mounted to shelf 20. Photovoltaic cells 602 may be directly mounted to shelf 20, or alternatively, may be indirectly mounted to shelf 20. Photovoltaic cells 602 may be mounted to shelf 20 using any of a variety of suitable methods including, but not limited to, mechanical fasteners (e.g., clips, screws, staples, brackets, collars, cover plates, etc.), adhesives, and/or any suitable welding process. The mounting of photovoltaic cells 602 may be intended to be relatively permanent, or alternatively, may be intended to be removable so that photovoltaic cells 602 readily removed and replaced (or repaired) if damaged.

To protect photovoltaic cells 602 from contaminants and/or manipulation (e.g., vandalism), a relatively clear member may be disposed over photovoltaic cells 602. For example, a relatively clear (e.g., translucent, etc.) glass member or plastic member (e.g., acrylic, etc.) may be disposed over photovoltaic cells 602. Such a member may also be configured to at least partially secure photovoltaic cells 602 to shelf 20. The member may be a relatively rigid member, or alternatively may be a relatively flexible member such as a flexible film, or some other suitable material.

Figure 6:
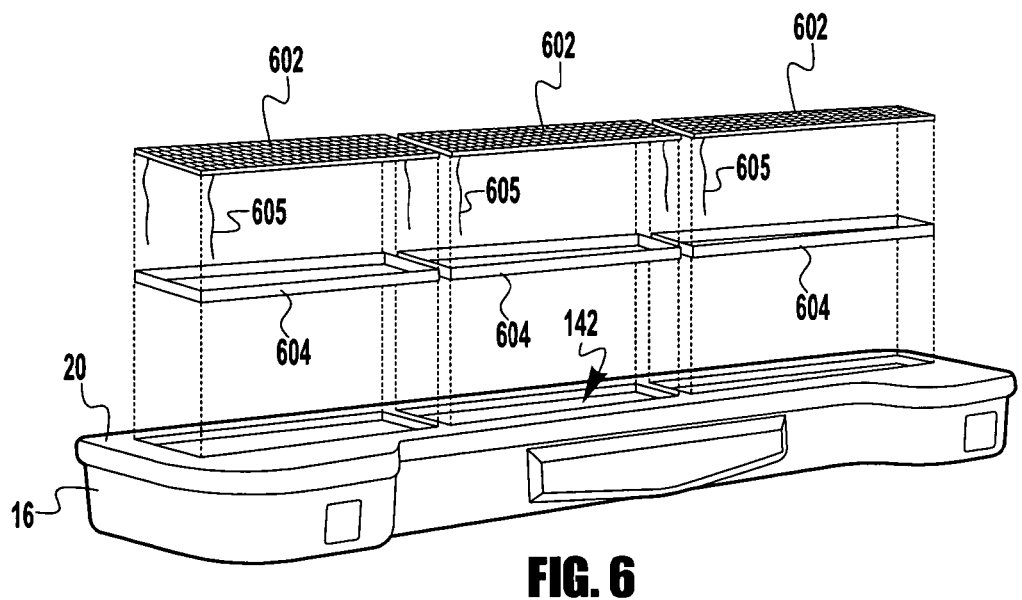
FIG. 6 is an exploded perspective view of an upper portion of a lavatory system showing a photovoltaic system according to another embodiment.
Figure 7:
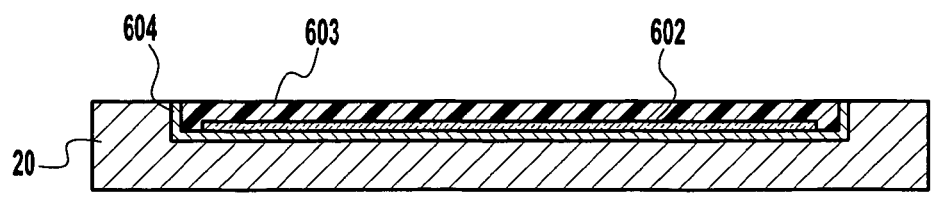
FIG. 7 is a partial cross section of the upper portion of the lavatory system shown in FIG. 6 showing a photovoltaic cell unit coupled to the lavatory system.

FIGS. 6 and 7 show a method of coupling photovoltaic cells 602 to lavatory system 10 according to another exemplary embodiment. Lavatory system 10 is shown as being configured to support one or more photovoltaic cell packages or units comprising a receptacle (shown as a relatively shallow pan or tray 604). Tray 604 is sized and dimensioned to receive one or more photovoltaic cells 602. Photovoltaic cells 602 are coupled to tray 604, which is in turn coupled to lavatory system 10.

Trays 604 may be permanently coupled to lavatory system 10 or detachably coupled to lavatory system 10. The use of photovoltaic cell units may provide for modularity in lavatory system 10, and allow photovoltaic cells 602 to be readily installed, removed, and/or interchanged. Such a configuration may allow photovoltaic cells 602 to be efficiently removed in the event that photovoltaic cells 602 are to be repaired or replaced. Preferably, the photovoltaic cell units are coupled to lavatory system 10 from an area generally not accessible to a user (e.g., from the bottom of shelf 20) in an attempt to protect from (or minimize the effect of) tampering and/or vandalism and/or other known harm to photovoltaic cells 602.

Tray 604 is shown as being coupled to shelf 20 of support structure 12 and received within recess 142. Referring to FIG. 7, photovoltaic cells 602 are coupled to tray 604 using resin 603. According to a preferred embodiment, photovoltaic cells 602 are inserted in tray 604 and resin 603 is disposed over the tops of photovoltaic cells 602 and allowed to harden. The resultant photovoltaic cell units may then be coupled to shelf 20.

Figure 10:
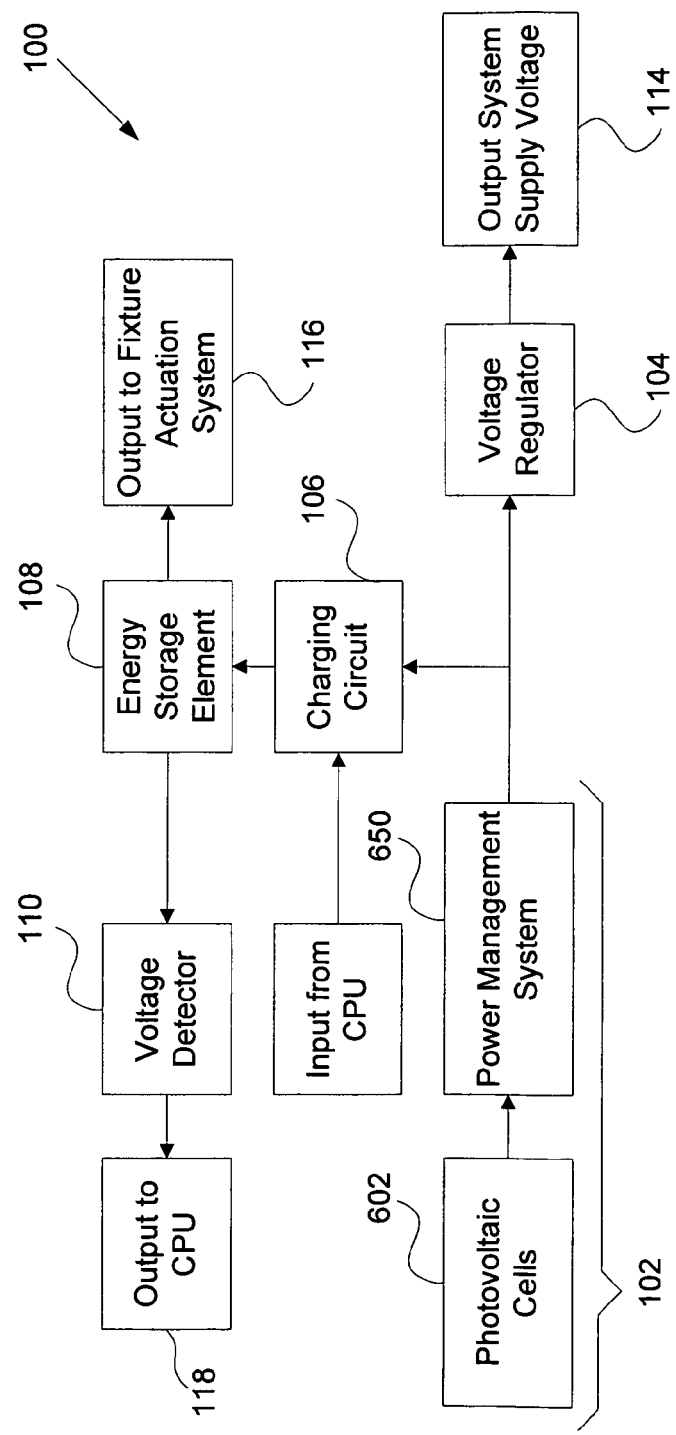
FIG. 10 is a schematic block diagram of a power supply system of the control system shown schematically in FIG. 8 according to another exemplary embodiment.

FIGS. 10 and 16 show a block diagram of control system 50 incorporating photovoltaic system 600 as power source 102. It should be noted that photovoltaic system 600 not limited in application to control system 50 or other control systems designed to provide for "hands free" operation of a fixture. According to various alternative embodiments, photovoltaic system 600 may be used in combination with other forms of control systems and/or fixtures requiring or using electric energy in order to operate (or assist in operation). For example, photovoltaic system 600 may be configured to provide electrical energy to a control system coupled to a fixture having a user interface that is electrically actuated (e.g., an electric push-button, a touch sensor, etc.).

FIG. 17 shows a detailed block diagram of power management system 650 and components thereof according to an exemplary embodiment. Power management system 650 advantageously provides for an efficient use of the electrical energy generated by photovoltaic cells 602. Power management system 650 is shown as generally including an energy storage element 660 configured to receive and store electrical energy generated by photovoltaic cells 602, a detector 670 configured to measure the level (intensity) of ambient light, a switch 680 configured to disconnect energy storage element 660 from control system 50 if the level of ambient light drops below a predetermined value, and a voltage regulator 690 for adjusting the voltage being outputted to control system 50.

According to an exemplary embodiment, energy storage element 660 includes one or more capacitors suitable for receiving a electric charge from photovoltaic cells 602 and supplying an output voltage to control system 50. According to a preferred embodiment, energy storage element 660 includes a plurality of capacitors arranged in series to provide the desired capacitance of approximately 3.3 farads (F). According to a particularly preferred embodiment, energy storage element 660 includes a first capacitor, a second capacitor, and a third capacitor. First capacitor, a second capacitor, and a third capacitor are super capacitors having a capacitance of approximately 10 F each or a combined capacitance of approximately 3.3 F. According to an alternative embodiment, other numbers and/or types of capacitors may be used and such capacitors may be arranged in series and/or in parallel.

Energy storage element 660 may be fully charged or partially charged by photovoltaic cells 602. The rate at which energy storage element 660 is charged depends at least partially on the intensity of the ambient light and the effectiveness (e.g., number, size, efficiency, etc.) of photovoltaic cells 602. During an initial setup (e.g., anytime energy storage element 660 is fully discharged), the time required to charge energy storage element 660 to a level sufficient to operate the components of control system 50 may be relatively long. The charging time during the initial setup can be reduced by adding a supplemental power source (e.g., a battery, etc.) to charge energy storage element 660. The supplemental power source provides a "jump-start" for energy storage element 660, and may significantly reduce the charging time. Preferably, any supplemental power source is removed once energy storage element 660 is sufficiently charged, but alternatively, may remain coupled to the system but electrically disconnected from energy storage element 660.

A fully charged energy storage element 660 is capable of providing a sufficient amount of electrical energy to power control system 50 for the selective operation of fixtures 14. According to an exemplary embodiment, energy storage element 660 is capable of providing a sufficient amount electrical energy to allow for more than one activation of fixtures 14 before energy storage element 660 needs to be recharged. According to a preferred embodiment, energy storage element 660 can retain or hold a sufficient amount of electrical energy to provide approximately 70 activations of fixtures 14 before needing to be recharged. As can be appreciated, in a typical application (e.g., an application wherein photovoltaic cells 602 are exposed to ambient light while lavatory system 10 is being used), photovoltaic cells 602 will continue to charge energy storage element 660 as electrical energy is provided for the activation of fixtures 14.

Control system 50 constitutes a load on energy storage element 660 that when electrically coupled thereto diminishes the electrical energy stored in energy storage element 660. Disconnecting energy storage element 660 from such a load will help maintain the charge of energy storage element 660. To determine whether power should be conserved by disconnecting control system 50 from energy storage element 660, power management system 650 further includes voltage detector 670. Voltage detector 670 includes an input 672 electrically coupled to an output from photovoltaic cells 602. Voltage detector 670 also includes an output 674 electrically coupled to switch 680.

An output voltage is provided by photovoltaic cells 602. The magnitude of the output voltage may be based upon the intensity of the ambient light and the efficiency of photovoltaic cells 602. Voltage detector 670 detects whether photovoltaic cells 602 are being exposed to a level of ambient light sufficient to meet the power demands of control system 50. According to an exemplary embodiment, a reference voltage value (a baseline value) representative of the sufficient level of ambient light is maintained by voltage detector 670. Such a reference value may be changed depending on the power requirements of control system 50.

According to an exemplary embodiment, if photovoltaic cells 602 are not being exposed to a sufficient level of ambient light, the assumption is that lavatory system 10 is not in use (e.g., the lights have been turned down and/or off) and that control system 50 does not need to be powered. In such a situation, control system 50 is disconnected from power management system 650 in an effort to conserve electrical energy. According to a preferred embodiment, voltage detector 670 measures the output voltage of photovoltaic cells 602 (received at input 672) and compares the output voltage with the reference voltage value. If the output voltage level is below the reference voltage level, voltage detector 670 will send an output signal (at output 674) to switch 680 indicating that control system 50 should be electrically disconnected from power management system 650. According to various alternative embodiments, voltage detector 670 may be replaced with any detector suitable for detecting the intensity of the ambient light at photovoltaic cells 602 including, but not limited to, a photodetector configured to monitor the ambient light and send a corresponding signal to switch 680.

Preferably, energy storage element 660 is capable of holding a charge with minimal leakage when disconnected from the load (control system 50). Providing energy storage element 660 that is capable of maintaining a charge with minimal leakage, may allow energy storage element 660 to meet the electrical power requirements of control system 50 after photovoltaic cells 602 have not been exposed to ambient light for an extended period of time (e.g., a weekend, etc.). This will eliminate the need to recharge energy storage element 660 (e.g., by a supplemental power source and/or by photovoltaic cells 602, etc.), or at least reduce the time required to recharge energy storage element 602, when the ambient light returns and a user seeks to use fixtures 14 of lavatory system 10. When voltage detector 670 measures a voltage at or above the predetermined baseline voltage, switch 680 reconnects power management system 650 to control system 50.

Power management system 650 is further shown as including voltage regulator 690 adapted for receiving a first voltage from photovoltaic cells 602 and providing a second voltage to control system 50. According to an exemplary embodiment, voltage regulator 690 is capable of providing a relatively stable operating voltage to control system 50. According to an exemplary embodiment, voltage regulator 690 is shown schematically as a dc-to-dc converter. According to a preferred embodiment, the voltage entering the dc-to-dc converter may range between approximately 1.5 volts and 7.5 volts, while the voltage exiting the dc-to-dc converter is approximately 5 volts. As can be appreciated, the input and output voltages may vary in alternative embodiments.

It is important to note that the construction and arrangement of the elements of the lavatory system, including the fixtures, the control system, and/or the photovoltaic system, as shown in the preferred and other exemplary embodiments are illustrative only. Although only a few embodiments of the present inventions have been described in detail in this disclosure, those skilled in the art who review this disclosure will readily appreciate that many modifications are possible (e.g., variations in sizes, dimensions, structures, and proportions of the various elements, values of parameters, mounting arrangements, etc.) without materially departing from the novel teachings and advantages of the subject matter recited herein. For example, the circuit diagrams provided are schematic only, and the values for the individual components (e.g., the ratings for the resistors, capacitors, etc.) may vary according to alternative embodiments. Further, while the description herein may suggest that a pulse generator is used to control pulsing of the transmitter, such control may be accomplished by other means (e.g., software, programming, computations, algorithms, etc.). Even further, while the inventions described herein are described with reference to use washing stations, the inventions may be used with any of a variety of different applications wherein a control system of the type disclosed herein would be beneficial. Further, the position of elements may be reversed or otherwise varied (e.g., the circuit diagram may be modified or may be incorporated in other circuits), and the nature or number of discrete elements or positions may be altered or varied. It should further be noted that the scope of the inventions include all software conventionally known or suitable for use with proximity sensors. For example, the control system may be programmed with failure modes for closing the valve if left open for an extended period. Further, the control system may be programmed to provided extended sleep periods when the fixture has not been used for a set time. The control system may also be programmed to require two positive reads before the valve is opened.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. A lavatory system comprising:
   a support structure comprising:
      a lower portion supporting a wash basin configured to operate as a continuous receptacle for a first fluid dispensing fixture and a second fluid dispensing fixture; and
      an upper portion comprising a shelf positioned above the wash basin, the shelf having a front surface, a bottom surface and a top surface defining a recess, wherein the first and second fluid dispensing fixtures are coupled to the bottom surface of the shelf and actuated based on a detection system housed in the front surface of the shelf detecting the presence of a user in front of the shelf; and
   at least one array of photovoltaic cells provided within the recess of the top surface of the shelf and configured to provide power for operating the detection system, the first fluid dispensing fixture, and the second fluid dispensing fixture, wherein the photovoltaic cells are positioned below the top surface of the upper portion of the support structure, and wherein a liquid sealer is applied to the least one array of photovoltaic cells which hardens relatively clear to cover the at least one array of photovoltaic cells such that the top surface of the upper portion of the support structure and the sealer define a continuous and planar outer support surface of the support structure; and
   a power management system comprising:
      an energy storage element configured to receive and store electrical energy generated by the photovoltaic cells; and
      a switch configured to disconnect the energy storage element from providing power to the detection system, the first fluid dispensing fixture, and the second fluid dispensing fixture so as to conserve electrical energy if the level of ambient light drops below a predetermined value.

2. The lavatory system of claim 1 wherein the shelf extends in a horizontal direction above the wash basin, the first fluid dispensing fixture, and the second fluid dispensing fixture.

3. The lavatory system of claim 2 wherein the at least one array of photovoltaic cells comprises a first array of photovoltaic cells, a second array of photovoltaic cells and a third array of photovoltaic cells, the first array of photovoltaic cells, the second array of photovoltaic cells and the third array of photovoltaic cells each being visually separated from each other by the upper surface of the shelf.

4. The lavatory system of claim 3 wherein the sealer covers the first array of photovoltaic cells, the second array of photovoltaic cells and the third array of photovoltaic cells.

5. The lavatory system of claim 3 wherein the first array of photovoltaic cells, the second array of photovoltaic cells and the third array of photovoltaic cells are electrically coupled to each other and together provide power for operating both the first fluid dispensing fixture and the second fluid dispensing fixture.

6. A lavatory system providing at least one wash station, the lavatory system comprising:
   at least one basin;
   at least one fixture supported at the at least one basin;
   a support structure having a first portion to which the at least one fixture is coupled and a second portion comprising a countertop, the countertop defining a bottom surface, a side surface, and an outer top surface, the top surface of the countertop having at least a first recess and a second recess formed in the outer top surface, and the side surface of the countertop housing a detection system for detecting the presence of a user in front of the countertop; and
   at least a first and second group of photovoltaic cells positioned within the first and second recesses defined by the countertop, the at least first and second groups of photovoltaic cells configured to provide power to the at least one fixture, the first group of photovoltaic cells being visually separated from the second group of photovoltaic cells by the outer top surface of the countertop, and
   a power management system comprising:
      an energy storage element configured to receive and store electrical energy generated by the first and second group of photovoltaic cells; and
      a switch configured to disconnect the energy storage element from providing power to the detection system and the at least one fixture,
   wherein the first and second groups of photovoltaic cells are positioned below the outer top surface of the countertop, and wherein a liquid sealer is applied to the first and second groups of photovoltaic cells which hardens relatively clear to cover the first and second groups of photovoltaic cells such that the outer top surface of the countertop and the sealer define a continuous and planar support surface.

7. The lavatory system of claim 6 wherein the sealer is provided in the first recess and the second recess to cover the first and second groups of photovoltaic cells without extending above the outer top surface of the countertop.

8. The lavatory system of claim 6 wherein the sealer is a resin comprising a first layer provided under the first and second groups of photovoltaic cells and a second layer provided on top of the first and second groups of photovoltaic cells.

9. The lavatory system of claim 6 wherein the at least one fixture comprises a first fluid dispensing fixture and a second fluid dispensing fixture, and wherein the first and second groups of photovoltaic cells provide power to both the first fluid dispensing fixture and the second fluid dispensing fixture.

10. The lavatory system of claim 6 further comprising a third group of photovoltaic cells supported at the countertop, the third group of photovoltaic cells being visually separated from both the first group of photovoltaic cells and the second group of photovoltaic cells by the outer top surface of the countertop.

11. The lavatory system of claim 10 wherein the first, second and third groups of photovoltaic cells are electrically coupled to each other.

12. A lavatory system providing at least one wash station, the lavatory system comprising:
   at least one basin;
   at least one fixture supported at the at least one basin;
   a support structure having a first portion to which the at least one fixture is coupled and a second portion comprising a countertop;
   a detection system located at a side surface of the countertop for detecting the presence of a user in front of the lavatory system; and
   at least one photovoltaic cell provided within a recess defined by an outer top surface of the countertop and configured to provide power for operating the at least one fixture,
   a power management system configured to control power to the detection system and the at least one fixture from the at least one photovoltaic cell;
   wherein a top surface of the at least one photovoltaic cell does not extend above the outer top surface of the countertop and a liquid sealer is applied to the at least one photovoltaic cell which hardens relatively clear to cover the at least one photovoltaic cell within the recess such that a top surface of the hardened sealer and the outer top surface of the countertop are coplanar and define a continuously flat surface.

13. The lavatory system of claim 12 further comprising:
   a first wash station comprising a first fluid dispensing fixture and a first drain; and
   a second wash station comprising a second fluid dispensing fixture and a second drain,
   wherein the support structure supports the first wash station and the second wash station, and wherein the countertop extends in a horizontal direction above the first fluid dispensing fixture and the second fluid dispensing fixture and spans a length between the first wash station and the second wash station.

14. The lavatory system of claim 13 wherein the at least one photovoltaic cell comprises a first array of photovoltaic cells and a second array of photovoltaic cells that are electrically coupled to each other to provide power for operating both the first fluid dispensing fixture and the second fluid dispensing fixture.

15. The lavatory system of claim 14 wherein the at least one photovoltaic cell further comprises a third array of photovoltaic cells.

16. The lavatory system of claim 15 wherein a portion of the countertop extends upward between the first array of photovoltaic cells, the second array of photovoltaic cells and the third array of photovoltaic cells to visually separate the first, second and third arrays of photovoltaic cells.

17. The lavatory system of claim 3, wherein the power management system is coupled to the first array of photovoltaic cells, the second array of photovoltaic cells, and the third array of photovoltaic cells, the power management system configured to receive power from the first array of photovoltaic cells, the second array of photovoltaic cells, and the third array of photovoltaic cells and distribute the power to the first and second fluid dispensing fixtures.

* * * * *